Nov. 30, 1948.　　　W. J. BRETH　　　2,455,038
APPARATUS FOR BUILDING TIRES
Filed June 14, 1944　　　　　　　　　16 Sheets-Sheet 1

INVENTOR
WALTER J. BRETH
BY
Evans + McCoy
ATTORNEYS

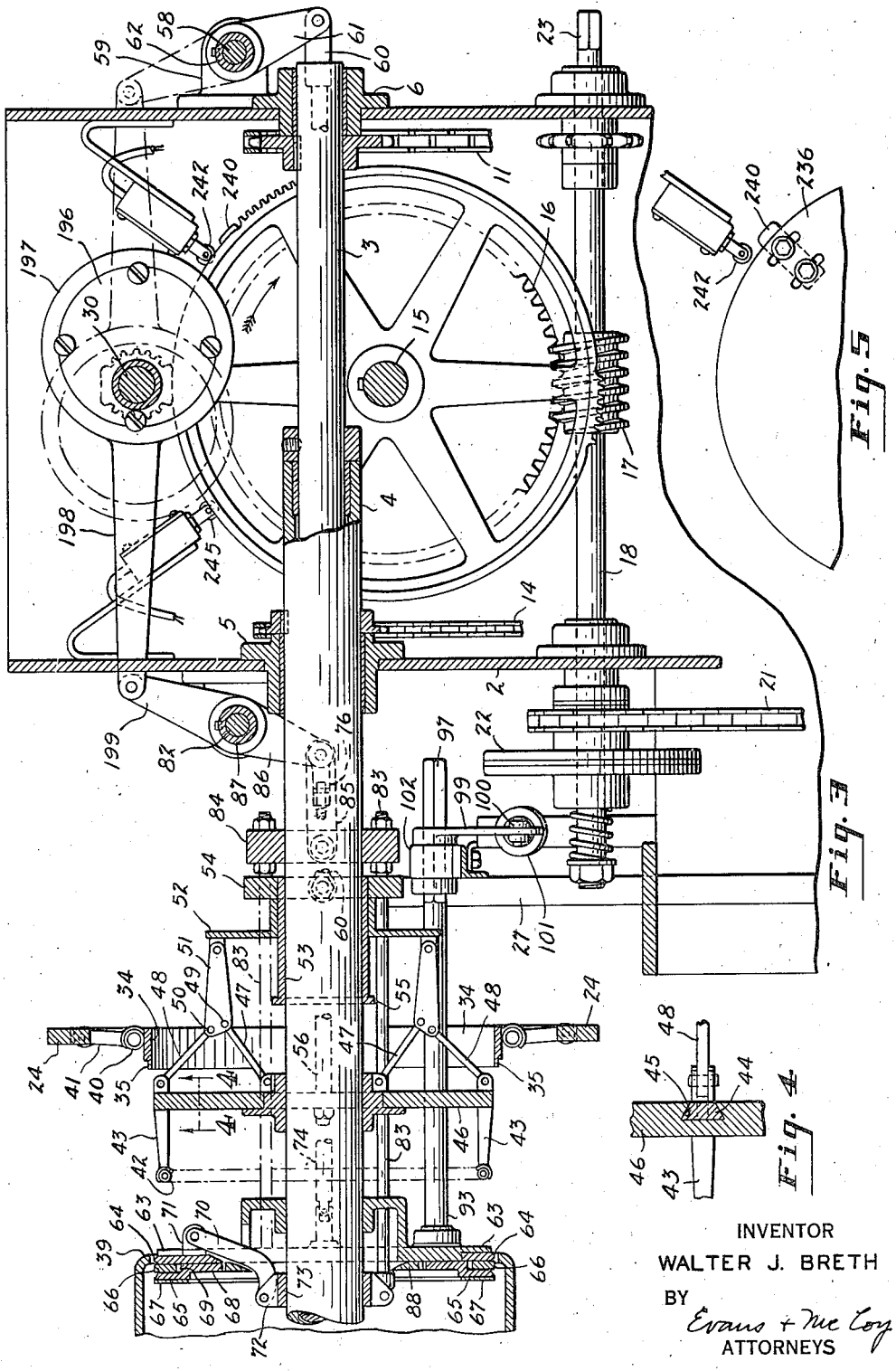

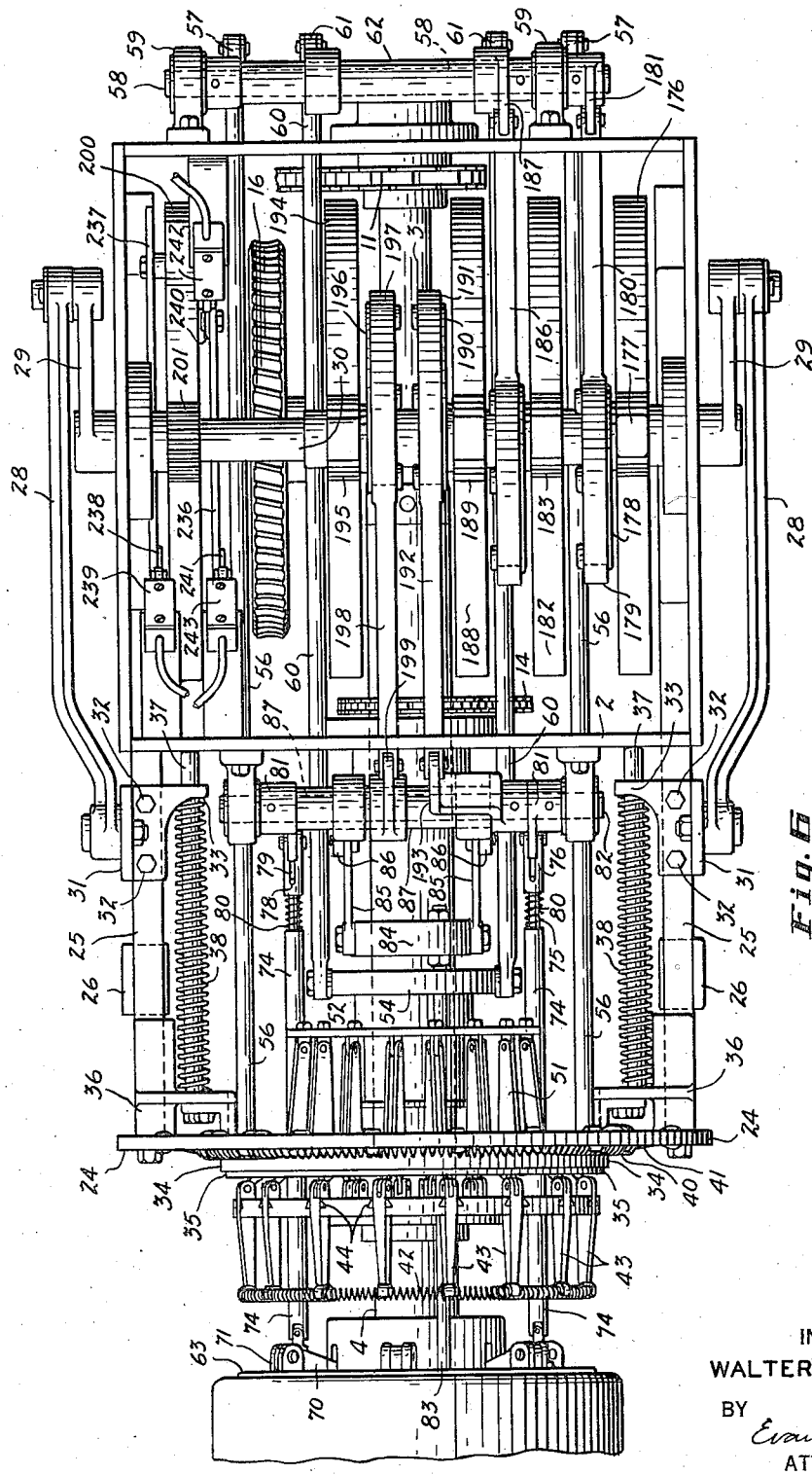

Nov. 30, 1948.    W. J. BRETH    2,455,038
APPARATUS FOR BUILDING TIRES
Filed June 14, 1944    16 Sheets-Sheet 5
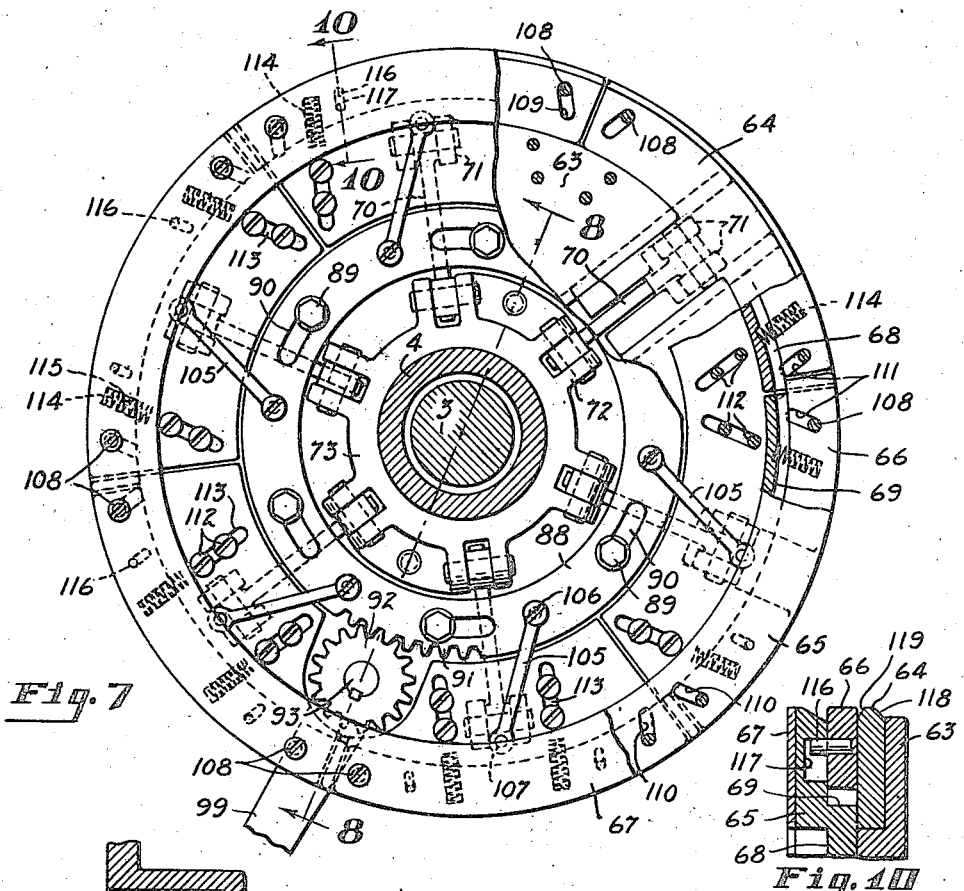
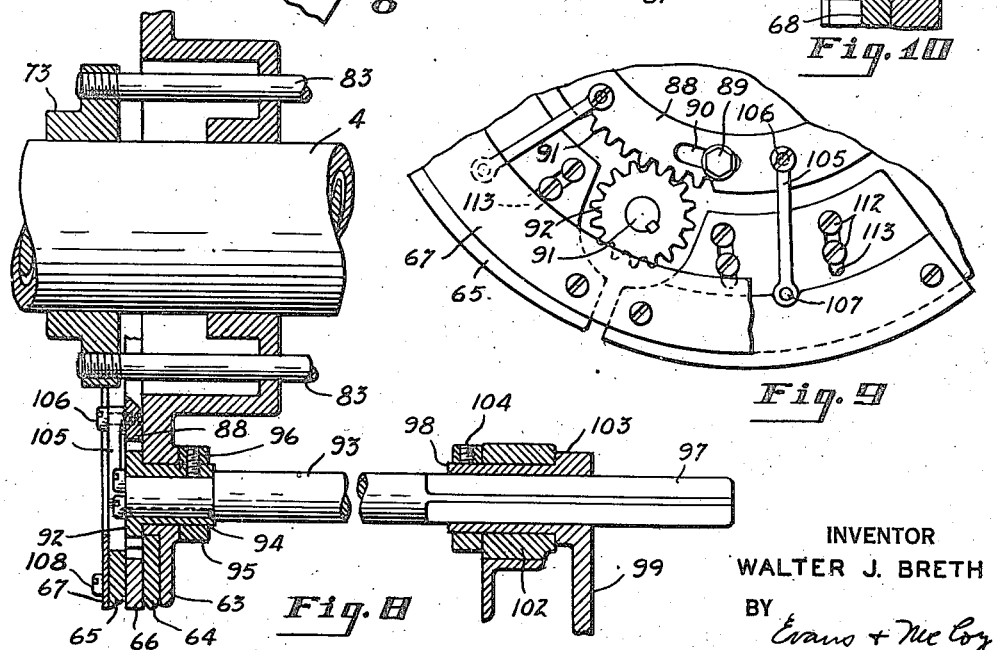
INVENTOR
WALTER J. BRETH
BY
ATTORNEYS Nov. 30, 1948.    W. J. BRETH    2,455,038
APPARATUS FOR BUILDING TIRES
Filed June 14, 1944    16 Sheets-Sheet 8

INVENTOR
WALTER J. BRETH
BY
Evans + McCoy
ATTORNEYS

Nov. 30, 1948.   W. J. BRETH   2,455,038
APPARATUS FOR BUILDING TIRES
Filed June 14, 1944   16 Sheets-Sheet 9

INVENTOR
WALTER J. BRETH
BY
Evans + McCoy
ATTORNEYS

Nov. 30, 1948.  W. J. BRETH  2,455,038
APPARATUS FOR BUILDING TIRES
Filed June 14, 1944  16 Sheets-Sheet 10
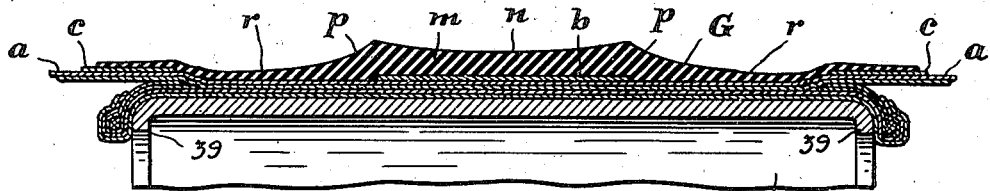
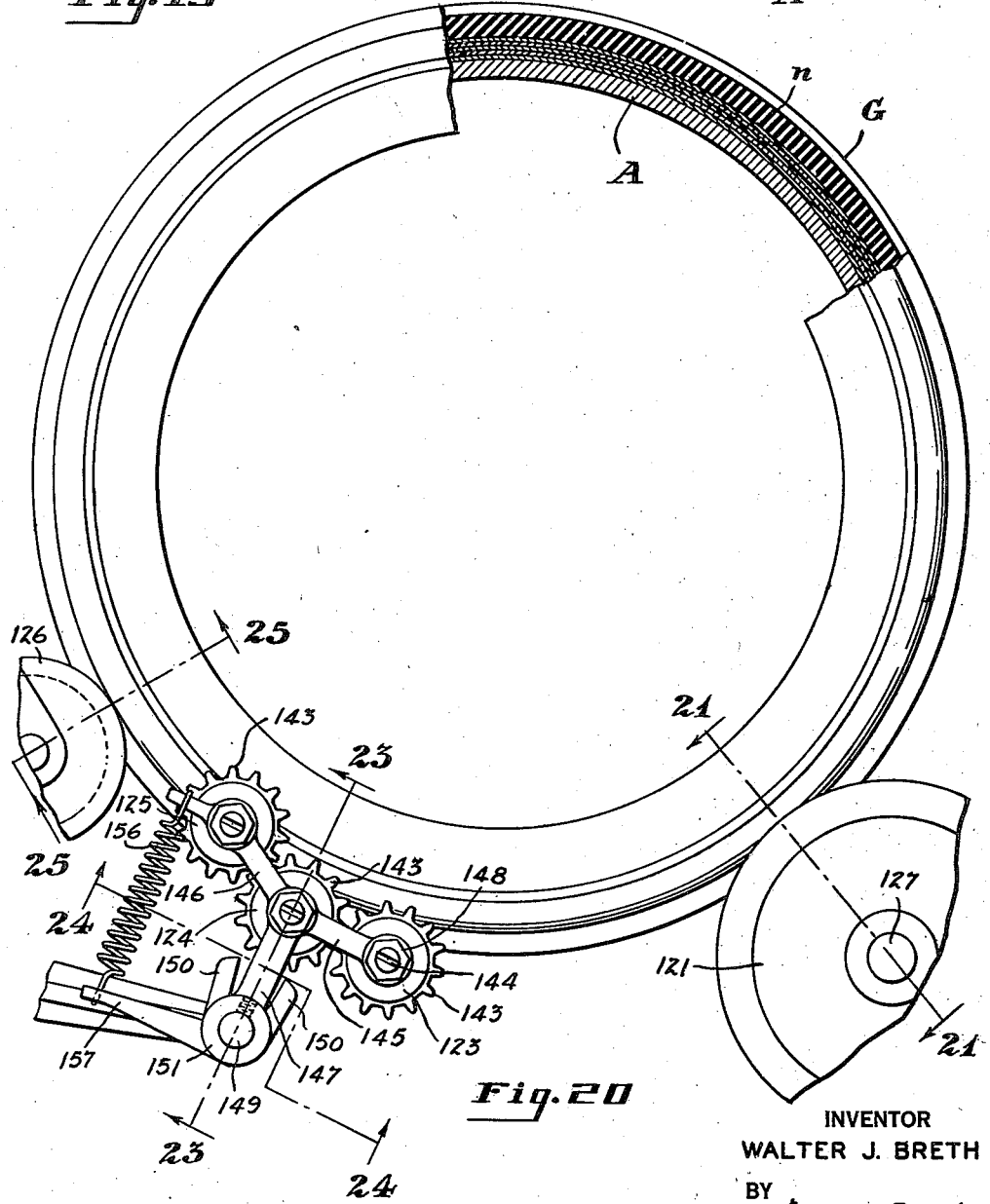
INVENTOR
WALTER J. BRETH
BY
  Evans + McCoy
  ATTORNEYS

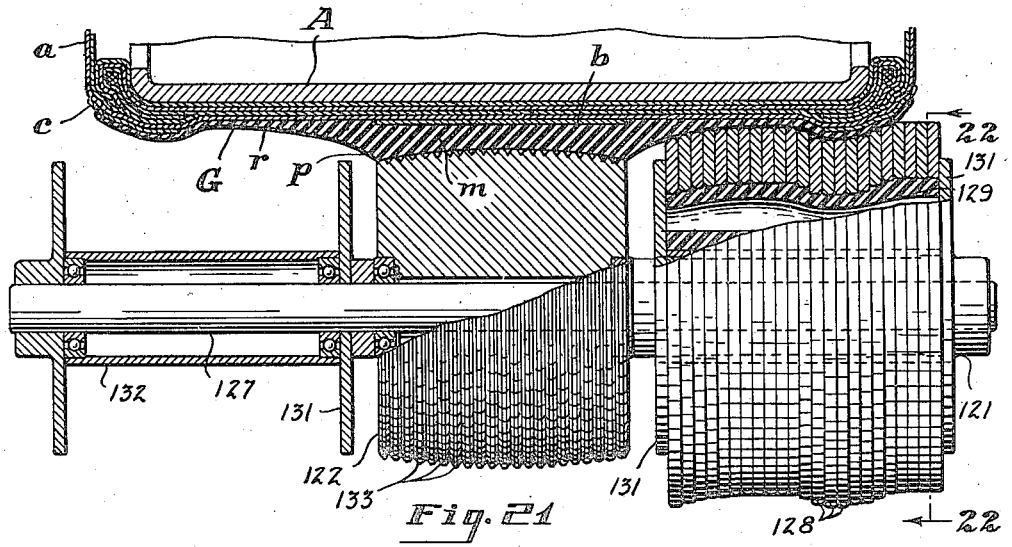
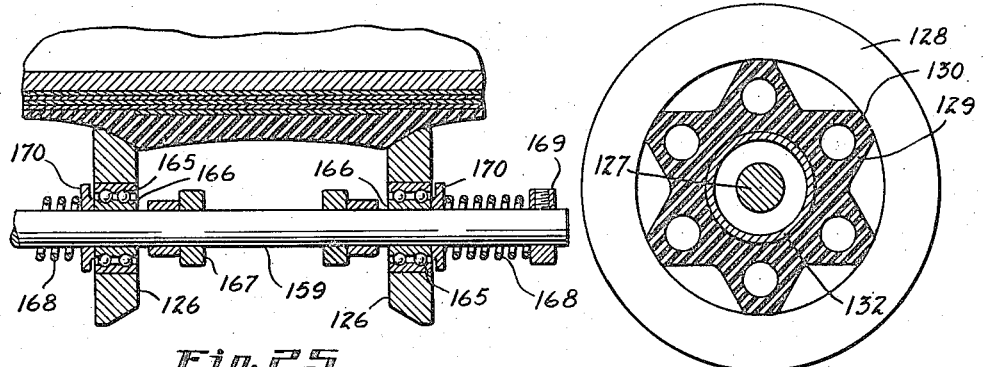
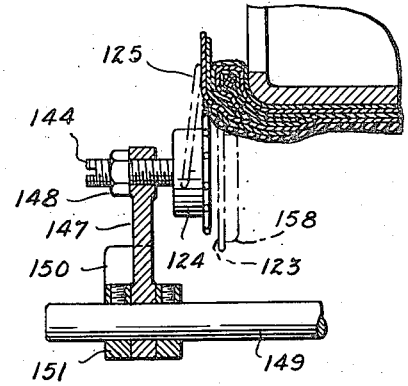
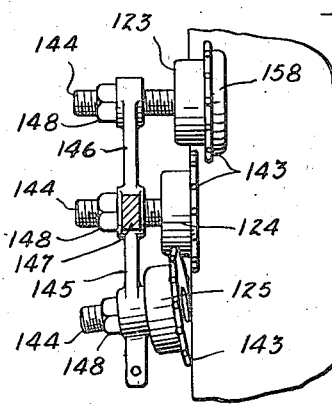

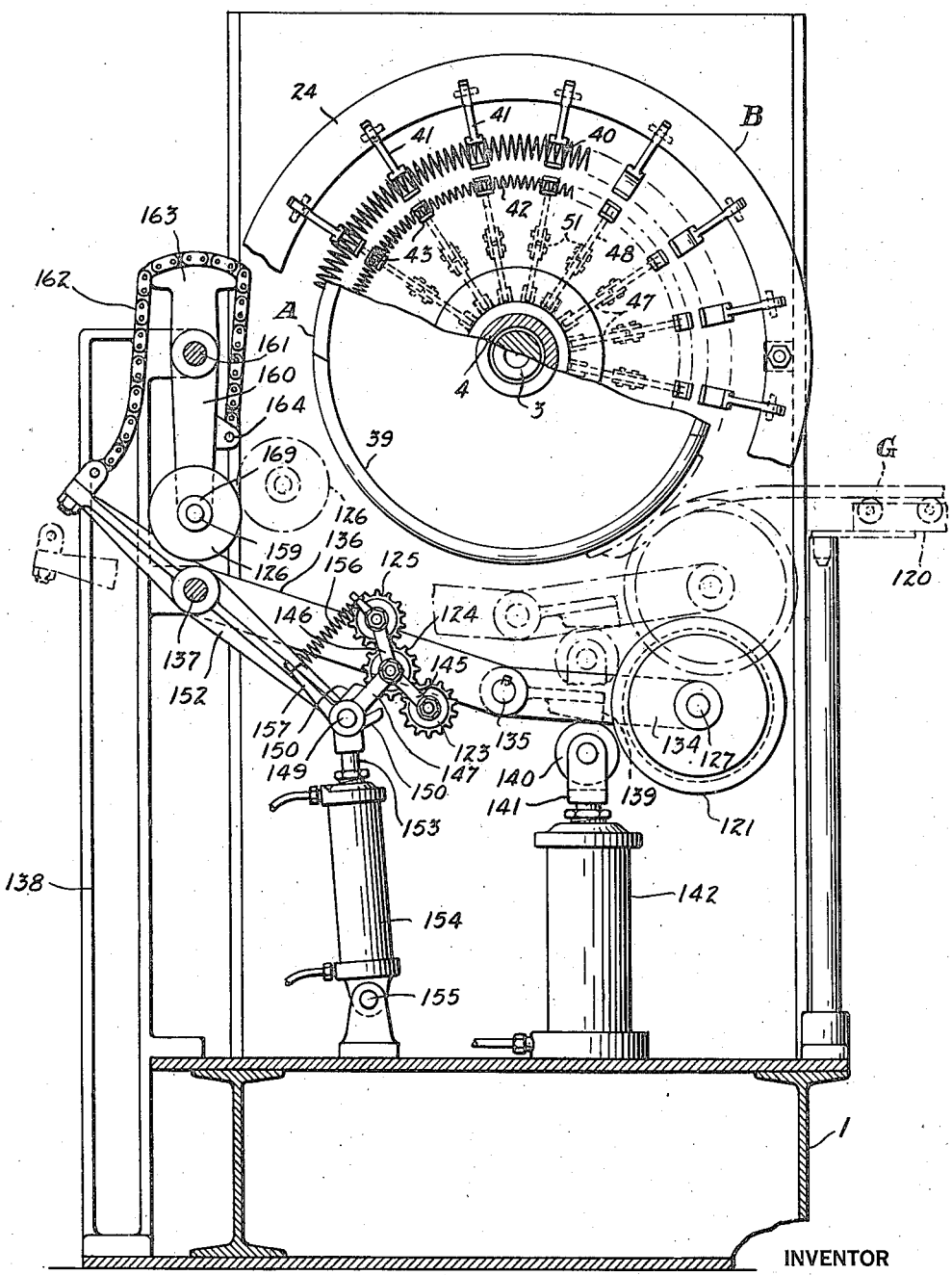

Nov. 30, 1948.   W. J. BRETH   2,455,038
APPARATUS FOR BUILDING TIRES
Filed June 14, 1944   16 Sheets-Sheet 13

INVENTOR
WALTER J. BRETH
BY Evans + McCoy
ATTORNEYS

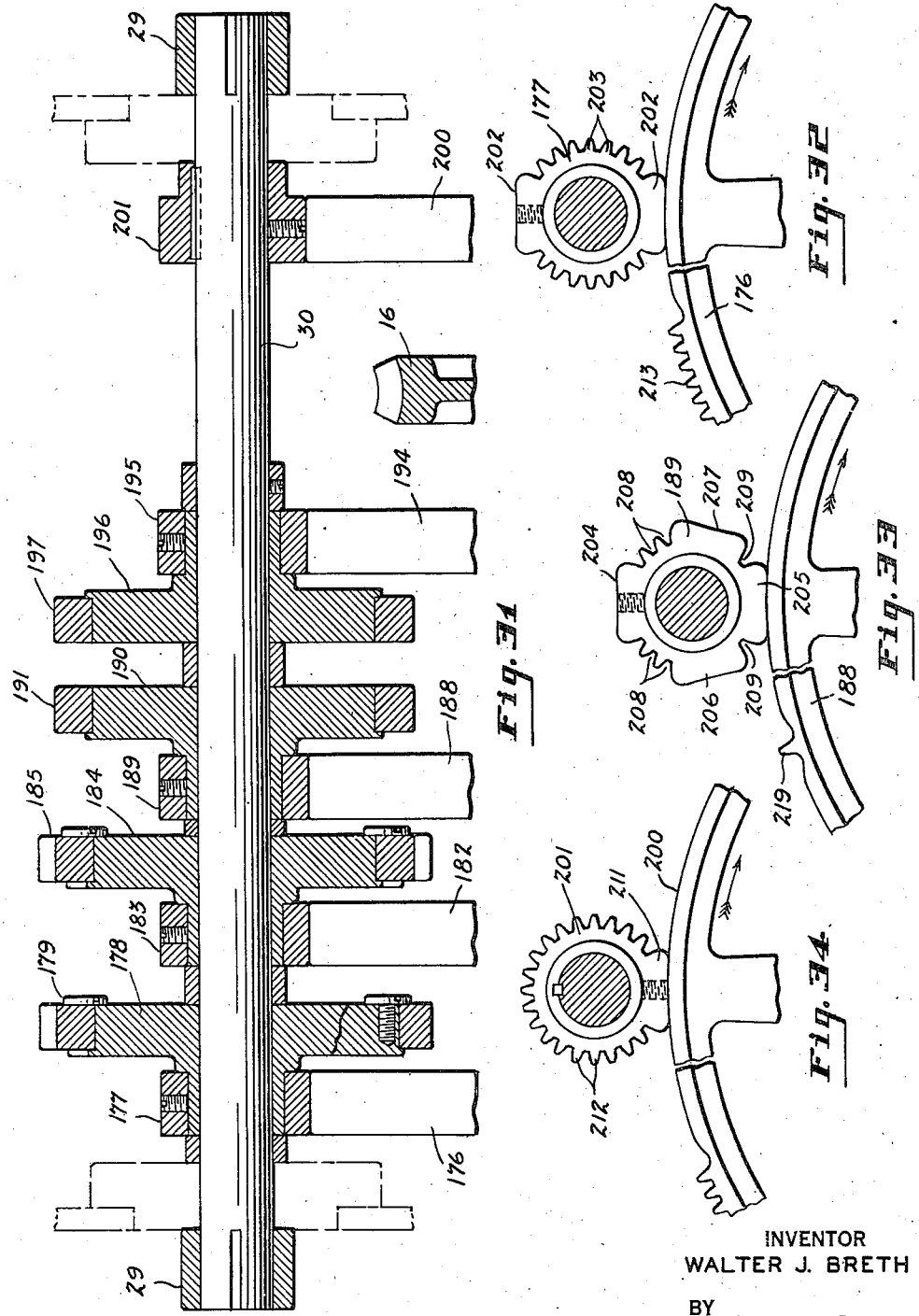

Nov. 30, 1948. W. J. BRETH 2,455,038
APPARATUS FOR BUILDING TIRES
Filed June 14, 1944 16 Sheets-Sheet 15
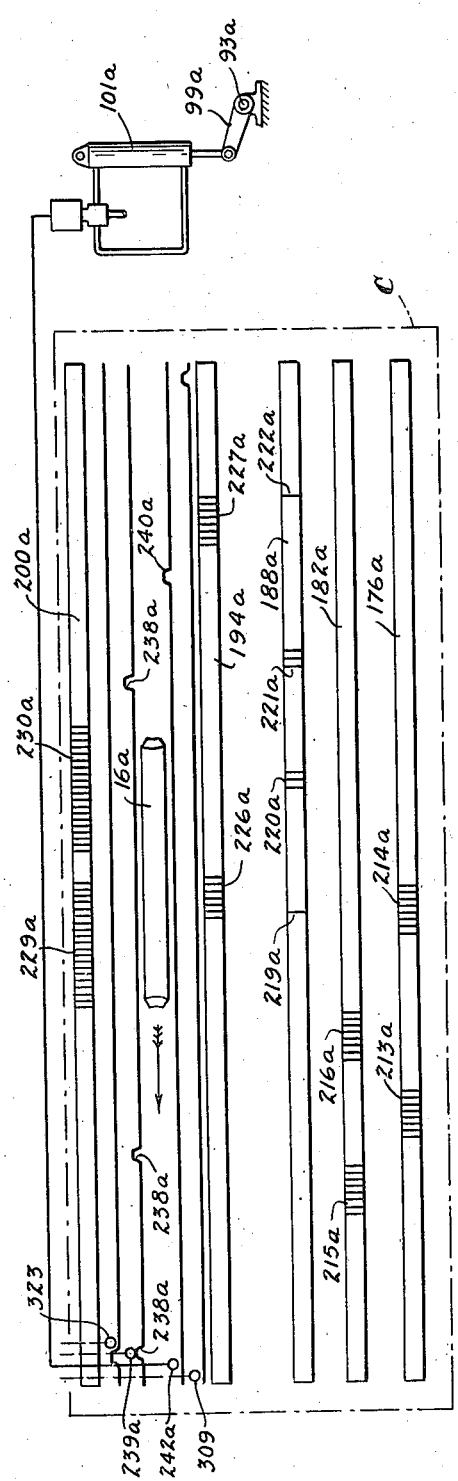
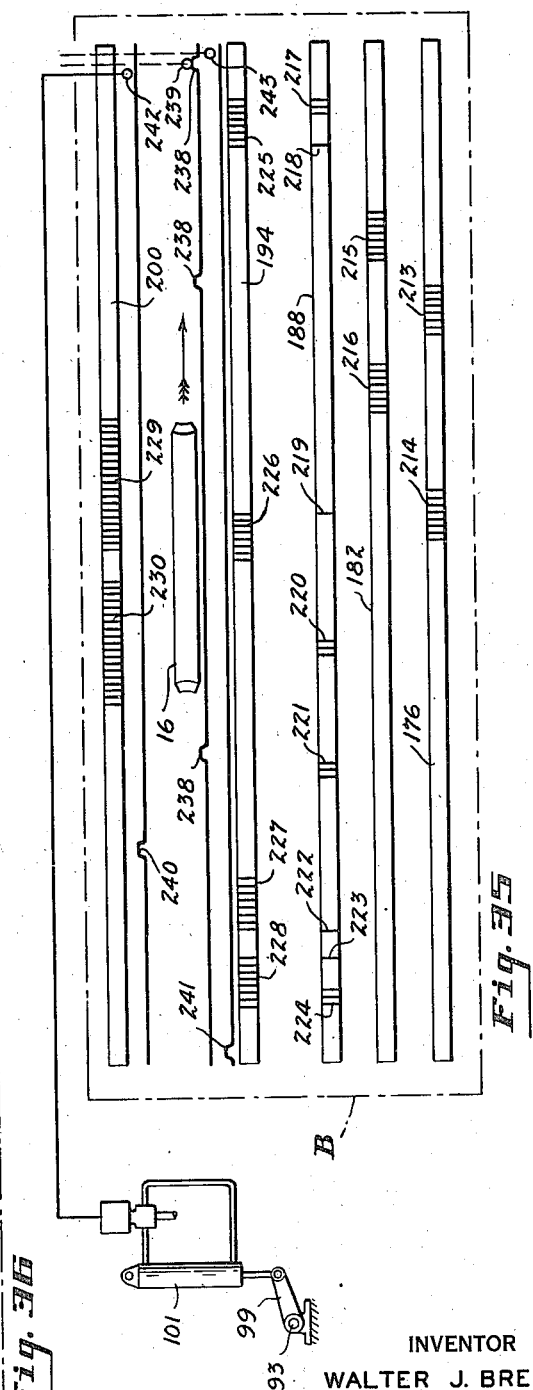
INVENTOR
WALTER J. BRETH
BY
Evans + McCoy
ATTORNEYS

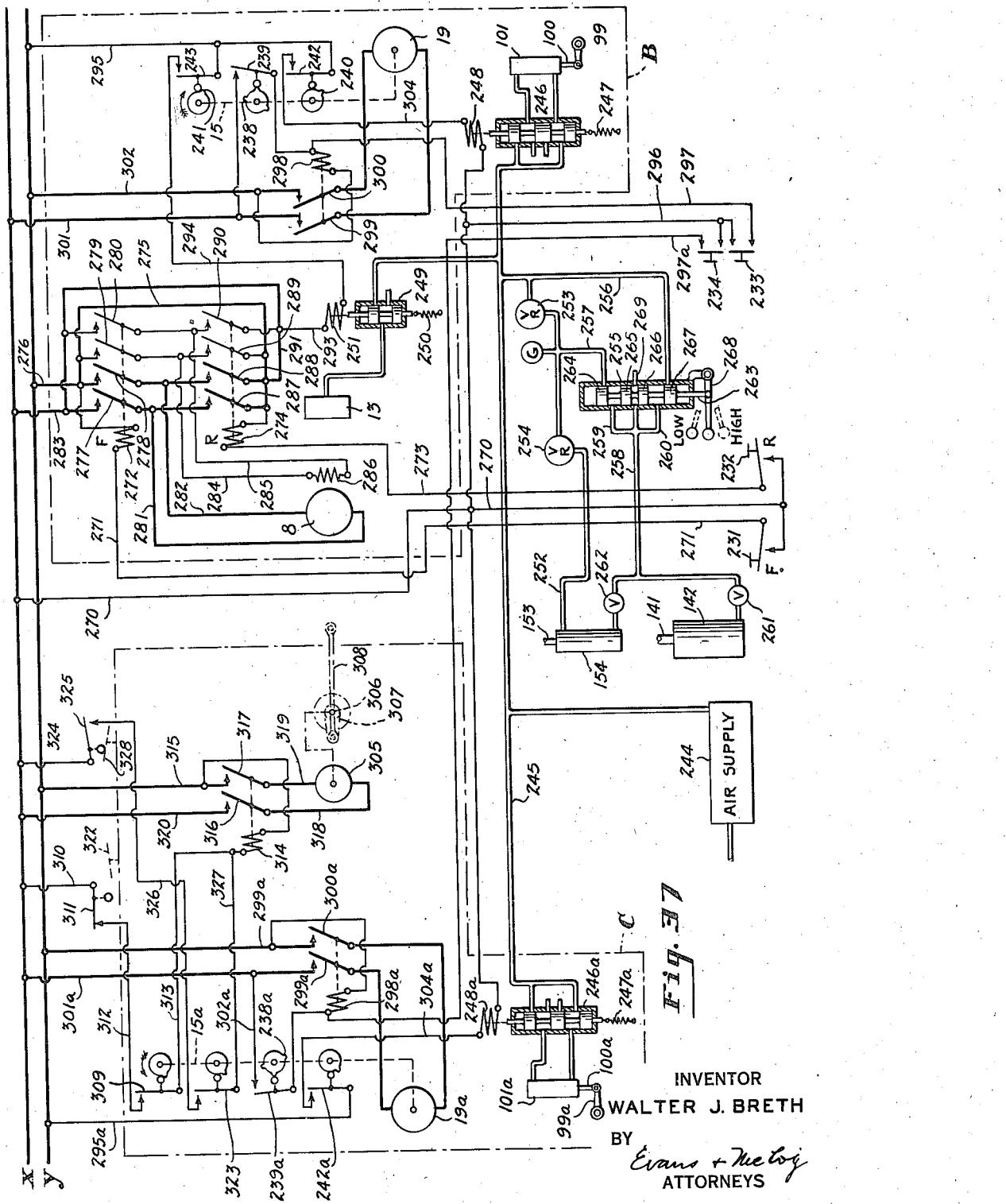

Patented Nov. 30, 1948

2,455,038

UNITED STATES PATENT OFFICE 2,455,038

APPARATUS FOR BUILDING TIRES

Walter J. Breth, Akron, Ohio, assignor to The General Tire & Rubber Company, Akron, Ohio, a corporation of Ohio Application June 14, 1944, Serial No. 540,306

17 Claims. (Cl. 154—10)

The present invention relates to a method of and apparatus for building pneumatic tires and is an improvement upon the method and apparatus of my Patent 2,313,035 granted March 9, 1943.

The present invention has for an object to provide a method by which tires of superior quality may be built more rapidly.

A further object of the invention is to provide a semi-automatic tire building machine that is more compact, greatly simplified in construction and which is capable of operation at high speed.

A further object of the invention is to provide a machine in which the weight of reciprocating elements is greatly reduced and in which the friction of moving parts is greatly lessened so that the machine may be operated by motors of less horsepower.

Further objects are to so regulate the operations that simpler control devices may be employed and so that single speed operating motors may be employed.

It is also an object of the invention to provide an operating mechanism for the intermittently operating bead forming instruments that is positive in operation and that insures the correct timing and sequence of operation.

An additional object of the invention is to provide an improved method of and means for folding the edges of the inner fabric plies over the ends of the drum.

A further object is to provide an improved means for applying the rubber covering to fabric plies previously placed upon the drum and improved means for compacting the tire body and firmly affixing together the fabric plies and rubber cover stock.

A further object is to provide fluid pressure actuators for cover stock applying and tire compacting rollers together with controlling means by which the rollers may be brought into engaging position in the proper sequence and applied with the proper pressures.

With the above and other objects in view, the invention may be said to comprise the method of and apparatus for building pneumatic tires as illustrated in the accompanying drawings hereinafter described and particularly set forth in the appended claims together with such variations and modifications thereof as will be apparent to one skilled in the art to which the invention pertains.

Reference should be had to the accompanying drawings forming a part of this specification in which:

Fig. 3 is a fragmentary vertical axial section through the stationary head and the adjacent end of the drum;

Fig. 4 is a fragmentary section taken on the line indicated at 4—4 in Fig. 3;

Fig. 5 is a fragmentary side elevation showing one of the automatically operated control switches;

Fig. 6 is a top plan view of the stationary head;

Fig. 7 is a vertical transverse section showing the inner expansible disk assembly in side elevation;

Fig. 8 is a section taken on the line indicated at 8—8 in Fig. 7;

Fig. 9 is a fragmentary side elevation of a portion of the disk assembly showing the inner disk in expanded position;

Fig. 10 is a fragmentary section taken on the line indicated at 10—10 in Fig. 7, showing the stop for the spring actuated segments of the intermediate disk;

Figure 11:
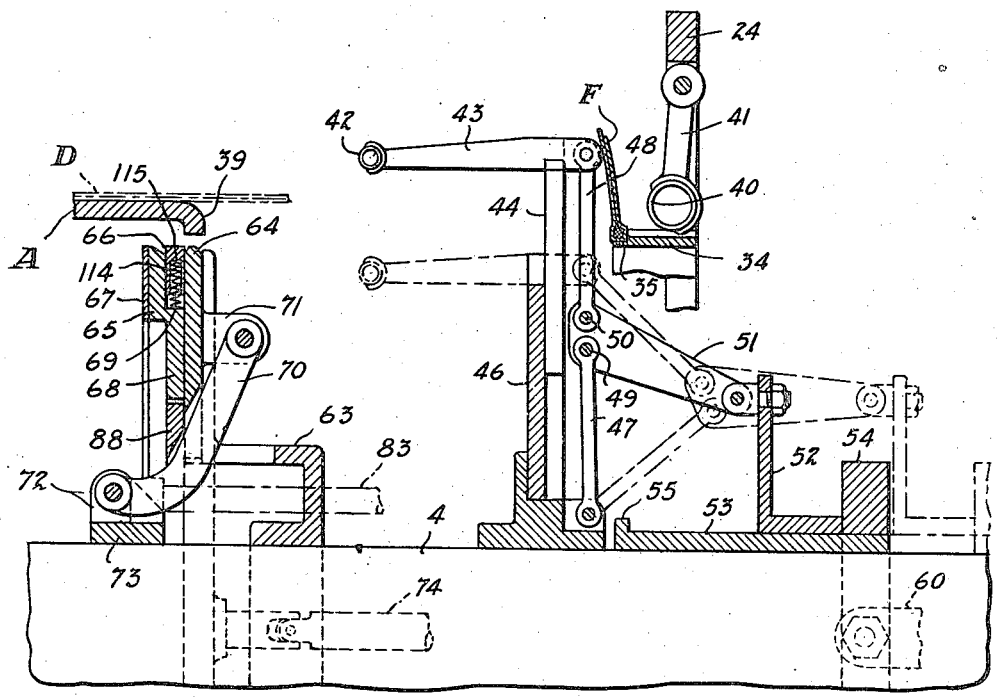

Figs. 11 to 18 inclusive are sectional views showing successive positions of the fabric shaping and bead applying devices;

Fig. 11 shows the resilient fabric folding ring in expanded position between the bead supporting annulus and drum.

Figure 1:
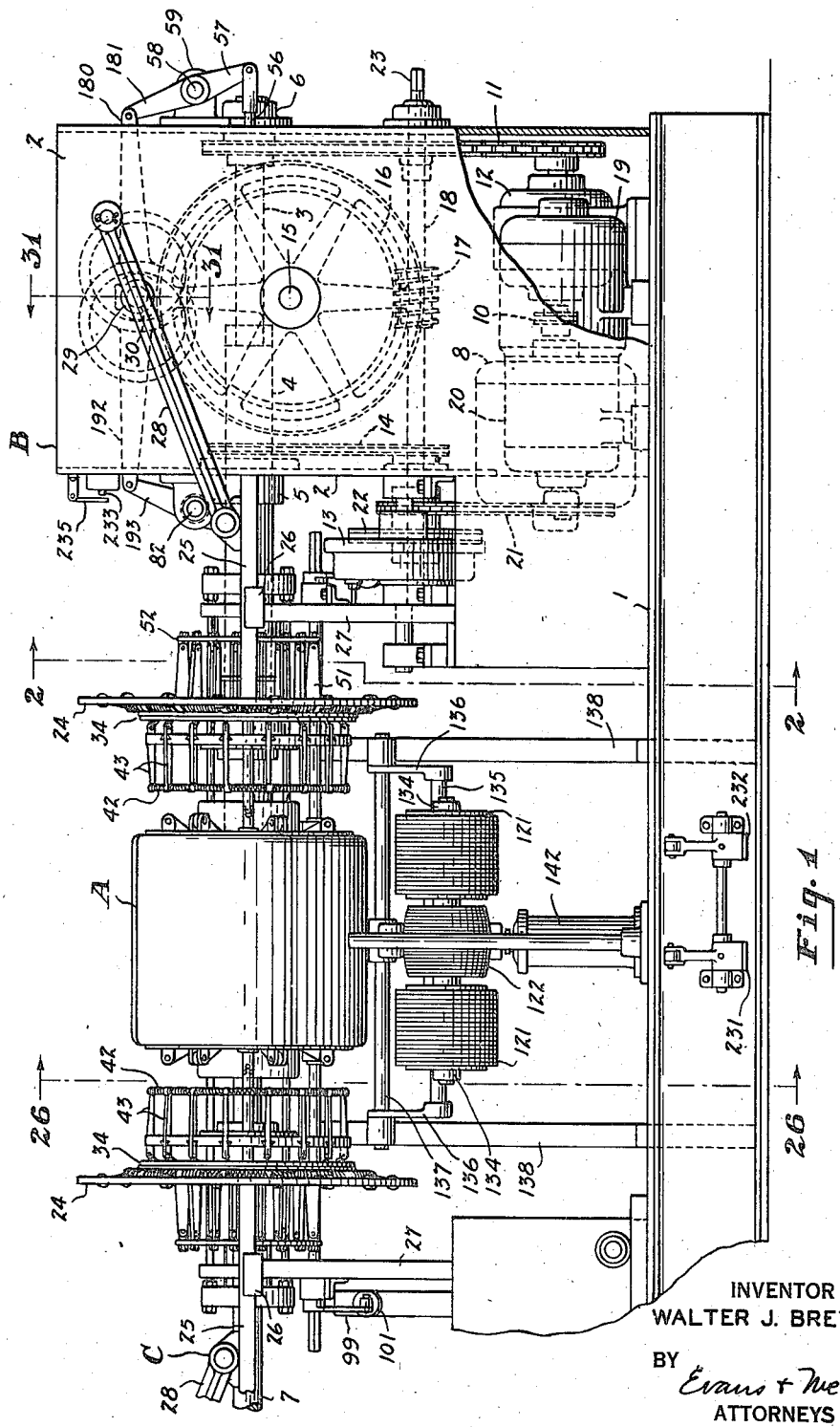
Fig. 1 is a fragmentary front elevation of a tire building machine embodying the invention, showing the tire building drum, the stationary bead building head and a portion of the movable bead building head.
Figure 12:
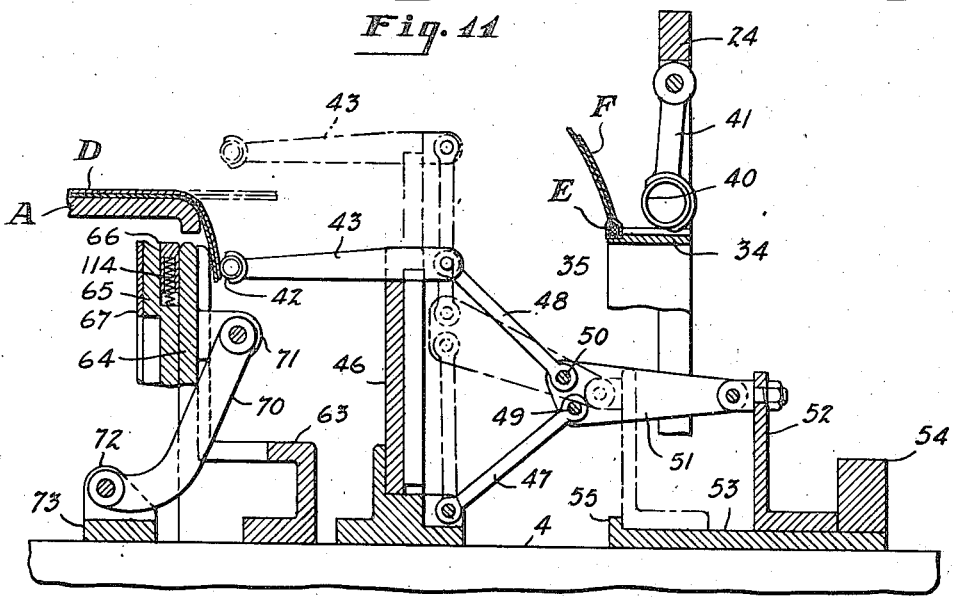
Figure 13:
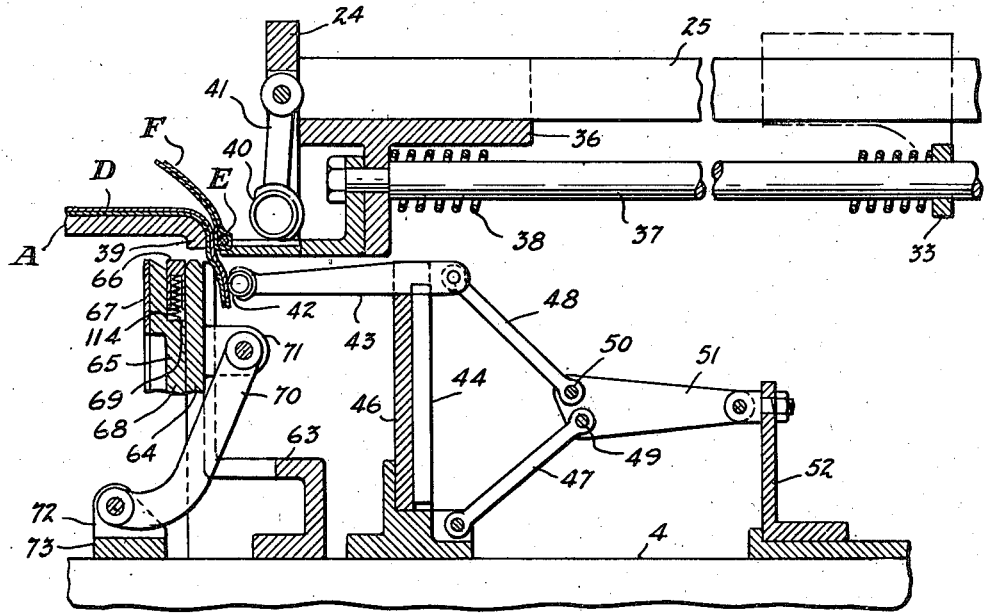
Figure 14:
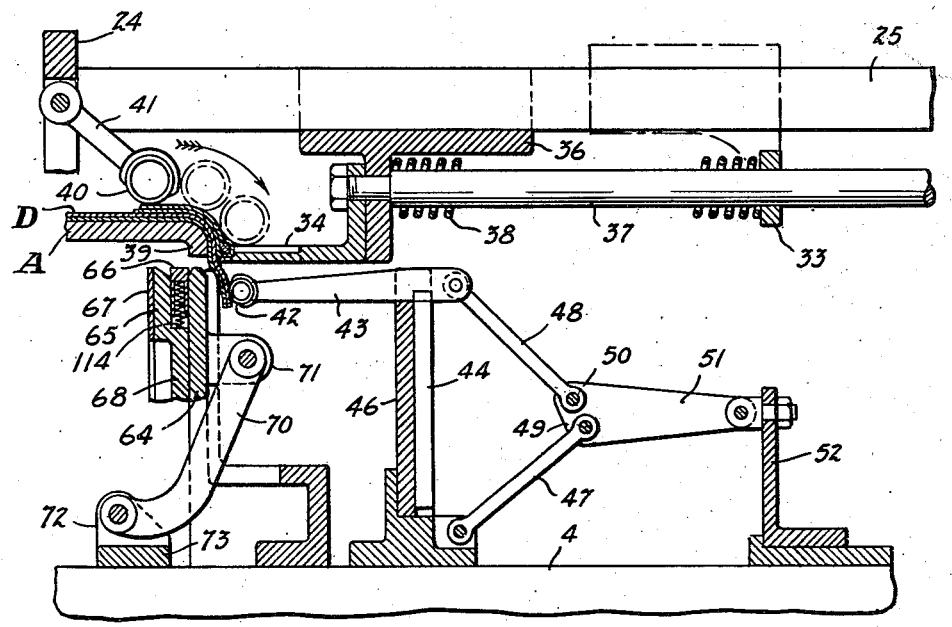
Figure 15:
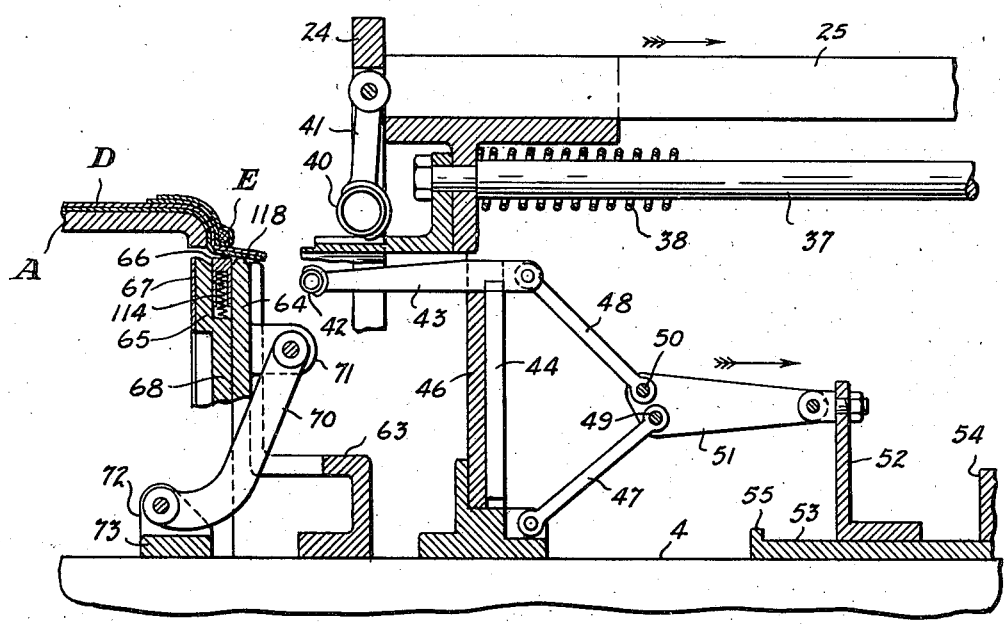
Figure 16:
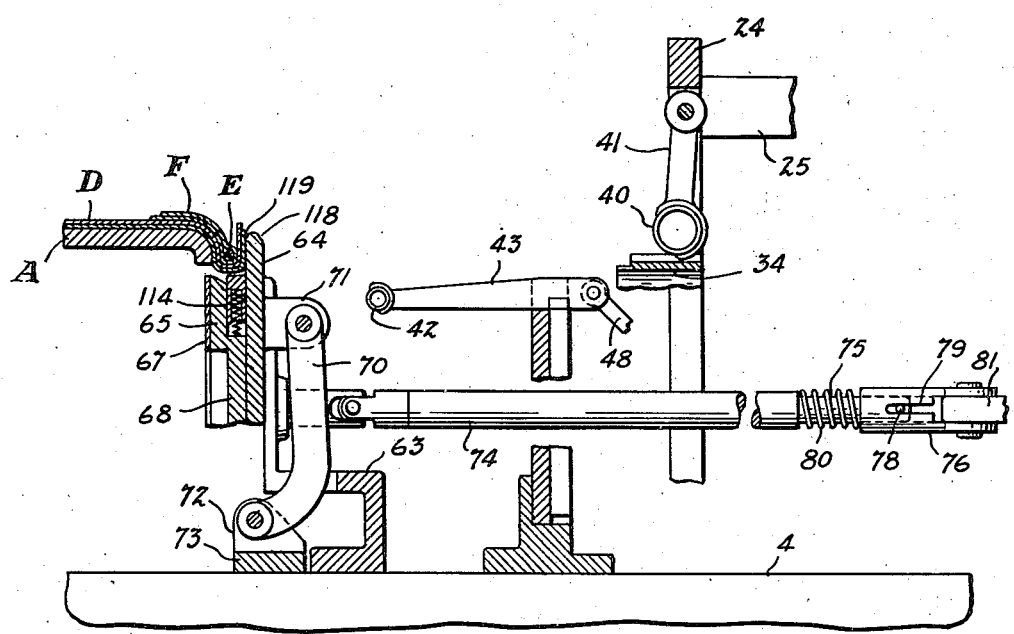
Figure 17:
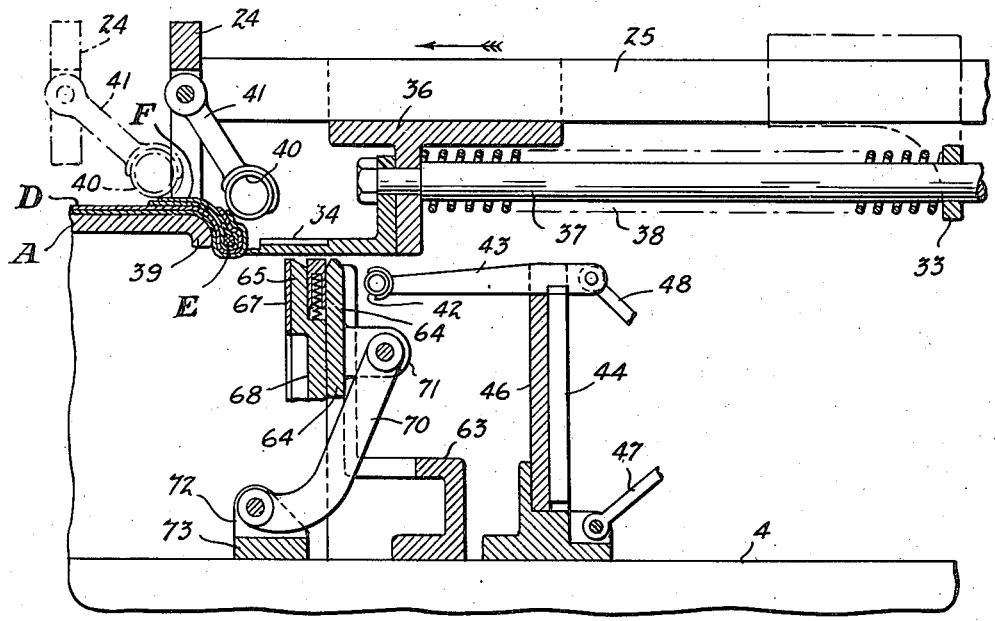
Figure 18:
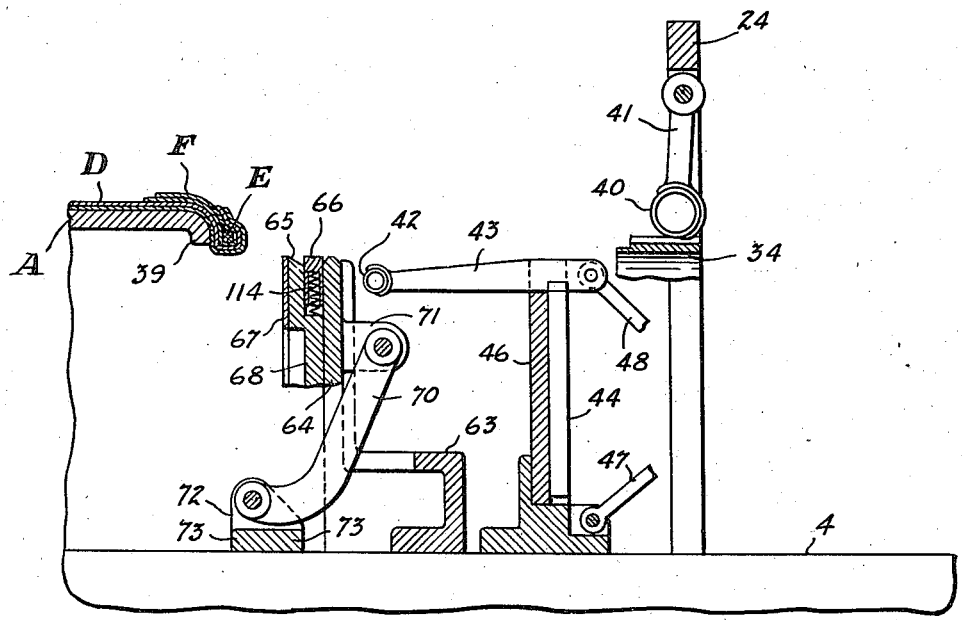
Figure 27:
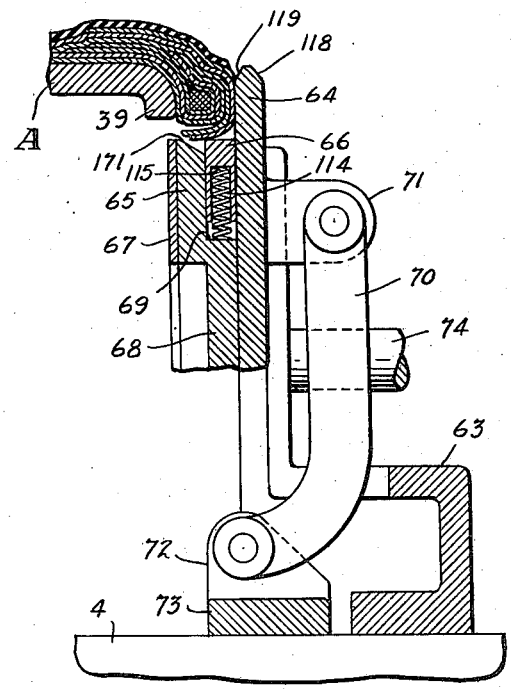
Figure 28:
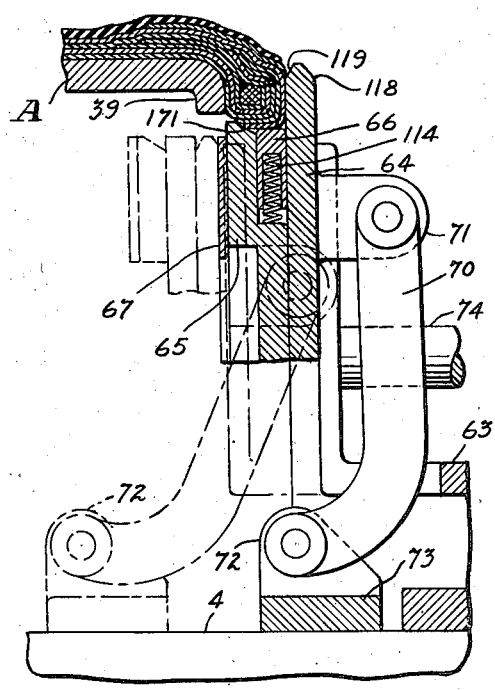
Figures 29, 30:
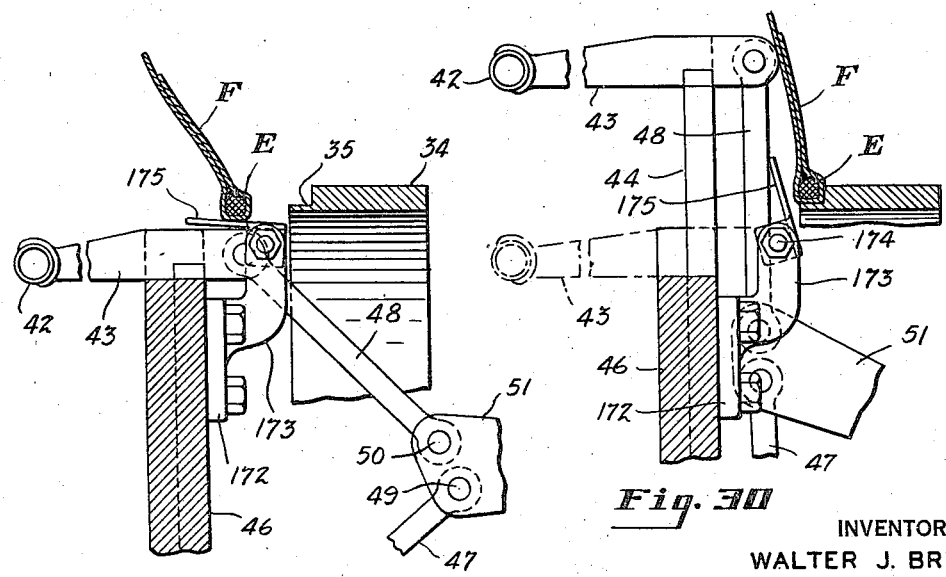

Fig. 12 shows in dotted lines the position of the fabric folding ring after it has been advanced to a position surrounding the projecting edge of the fabric band and, in full lines, the position of the ring after it has been released and allowed to snap to contracted position against the exterior surface of the projecting edge of the fabric band and form an inwardly projecting fabric flange overlying the end of the drum;

Fig. 13 shows the application of the bead ring to the fabric flange overlying the end of the drum;

Fig. 14 shows the flipper strip that is attached to the bead ring being pressed down on the fabric of the drum;

Fig. 15 shows the operation by which the fabric is folded outwardly against the interior of the bead ring;

Fig. 16 shows the fabric being folded outwardly against the outer face of the bead ring;

Fig. 17 shows the pressing in of the fabric edge against the drum shoulder outwardly of the bead ring;

Fig. 18 shows the movable parts of the bead building head in the retracted positions that they occupy during the application of the external fabric and rubber plies to the previously formed tire carcass on the drum;

Fig. 19 is a sectional view showing the external plies of fabric and rubber applied to the previously formed interior portion of the tire;

Fig. 20 is a diagrammatic end elevation showing the pressure and stitching rollers engaging the external plies;

Fig. 21 is a section taken on the line indicated at 21—21 in Fig. 20 showing the main pressure rollers engaging the external rubber covering of the tire;

Fig. 22 is a transverse section through one of the deformable pressure rollers taken on the line indicated at 22—22 in Fig. 21;

Fig. 23 is a fragmentary section taken on the line indicated at 23—23 in Fig. 20, showing the bead stitching rollers in engagement with the external fabric plies overlying the bead ring;

Fig. 24 is a fragmentary plan view of the bead stitching rollers viewed as indicated at 24—24 in Fig. 20;

Fig. 25 is a section taken on the line indicated at 25—25 in Fig. 20 showing the tread shaping rollers engaging the shoulders of the tread portion of the tire;

Fig. 26 is a vertical transverse section through the machine, taken on the line indicated at 26—26 in Fig. 1 and showing the pressure roll supports and actuators in side elevation;

Fig. 27 is a sectional view, showing the operation by which the outer fabric plies are folded against the interior of the bead;

Fig. 28 is a sectional view showing the final pressing of the fabric against the interior of the bead;

Fig. 29 is a sectional view showing a bead ring in position to be transferred to its seat on the rigid bead applying annulus;

Fig. 30 is a sectional view, showing the operation by which the bead ring is transferred to its seat;

Fig. 31 is a fragmentary axial section through the Geneva gears, employed for intermittently and sequentially operating the movable parts of the bead building head;

Figs. 32, 33 and 34 are fragmentary side elevations, each showing a different form of Geneva gear employed in the actuating mechanism;

Fig. 35 is a development in the plane of the sheet of the peripheries of the large Geneva gears of the stationary bead building head, showing the arrangement of teeth thereon;

Fig. 36 is a development similar to Fig. 35, showing the large Geneva gears of the movable head;

Fig. 37 is a combined wiring and the fluid pressure diagram, showing the means by which various operations performed by the machine are controlled.

The tire building machine of the present invention consists of a centrally disposed, collapsible tire building drum A which may be of the usual and conventional construction, a stationary bead building head B and a movable bead building head C, which serve to apply the bead rings to fabric at the ends of the drum and to shape the bead portions of the tire, the arrangement being similar to that disclosed in my Patent No. 2,313,035 granted March 9, 1943. Since the mechanisms on the two heads B and C are identical, except for certain details of the operating and control devices, the mechanism of the stationary head B is illustrated completely herein, while only enough of the head C is shown to make clear the operative relationship.

The machine of the present invention is mounted upon an elongated base 1, upon which the head B and the drum A are mounted in fixed positions, and upon which the head C is slidably supported for movement axially toward and away from the drum A. The actuating and control mechanism of the head B is mounted within a housing 2 having vertical inner and outer and side walls. The drum A, which is composed of collapsible segments, is supported on a shaft 3 and a sleeve 4 on the shaft 3, the segments of the drum being connected by suitable links to the sleeve and shaft so as to be expanded or collapsed by relative rotary movements of the sleeve and shaft. Since this construction is conventional for tire building drums, the linkage is not herein illustrated.

The supporting shaft 3 is mounted in bearings 5 and 6 in the inner and outer walls of the housing 2, and has interfitting engagement with an axially aligned shaft 7 on the movable head C. The shaft 3 is driven by an electric motor 8, mounted on a bracket 9 attached to the base 1, the shaft 3 being connected to the motor 8 through sprocket chains 10 and 11 and an interposed reduction gearing in a housing 12, the reduction gearing being driven by the motor through the chain 10 and the shaft 3 being driven from the reduction gearing through the chain 11. In order to cause relative rotation of the shaft 3 and sleeve 4 to collapse the drum, an air brake 13 is connected by a sprocket chain 14 to the sleeve 4. Upon application of the brake 13, the sleeve 4 is held against rotation, whereupon continued rotation of shaft 3 in one direction or the other will expand or collapse the drum.

A transverse actuating shaft 15 is journaled in the side walls of the housing 2, and this shaft has a worm wheel 16 attached thereto that meshes with a worm 17 on a longitudinal shaft 18 journaled in the inner and outer walls of the housing. The moving parts of the bead building head are actuated by the shaft 15, which is driven by an electric motor 19 through reduction gearing in a housing 20 and a sprocket chain 21 extending to the shaft 18.

The moving parts of the bead building head B are actuated by the shaft 15 and it is desirable that the rotation of this shaft be stopped upon excessive resistance to movement of any of these parts. The shaft 18 is, therefore, driven through a slip clutch 22 interposed between the sprocket chain 21 and the shaft 15. The shaft 18 preferably projects through the outer wall of the housing 2 and has a squared end 23 adapted to receive a hand crank by which the shaft may be turned manually to adjust the moving parts when desired.

Bead building devices

Figure 2:
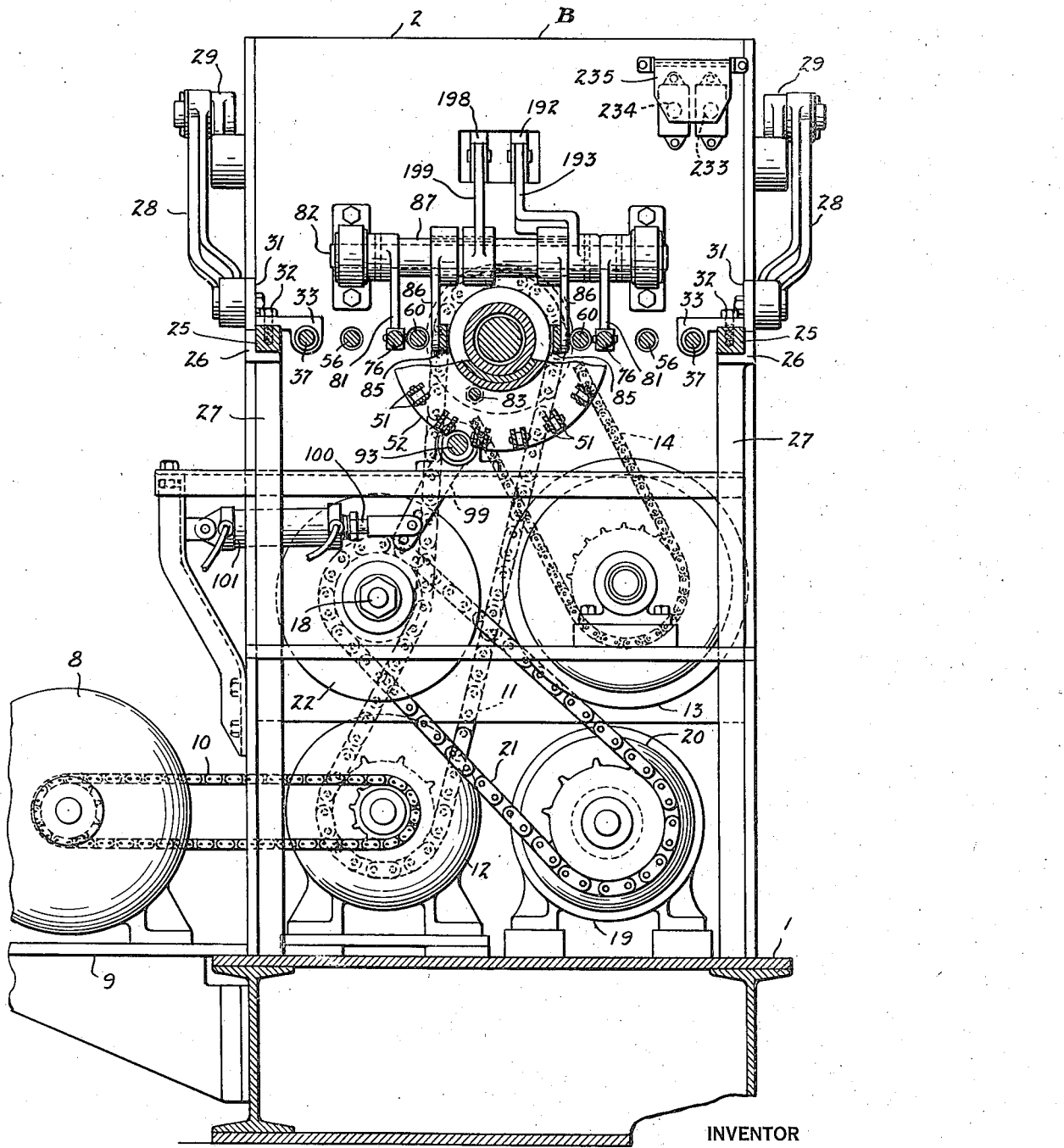
Fig. 2 is a transverse vertical section taken on the line indicated at 2—2 in Fig. 1.

The bead ring applying and bead forming instrumentalities of each of the bead building heads are annual members which engage with the bead ring and fabric throughout the circumference thereof. These annual members are coaxial with and surround the shaft 3 and are mounted for axial movements with respect to the drum. An annulus 24 is carried by axially extending square bars 25 which, as best shown in Fig. 6, are slidably mounted in the housing 2 and upon guides 26 at the upper ends of posts 27 mounted on base 1 inwardly of the housing, as shown in Fig. 2. Axial movements are imparted to the supporting bars 25 and the annulus 24 by means of connecting rods 28 that are pivotally connected to the bars 25 and to cranks 29 on the ends of a transverse shaft 30 mounted in the housing 2 above the shaft 15. The rods 28 are connected to brackets 31 attached to the tops of the bars 25 by bolts 32, the brackets 31 being provided with flanges 33 that project inwardly past the inner sides of the bars 25.

As shown in Fig. 3, a bead ring supporting annulus 34 is mounted for movement within the annulus 24 and is provided along its inner edge with a rabbeted bead ring seat 35. As shown in Fig. 6, supporting brackets 36 attached to the bead ring annulus 34 are slidable upon the bars 25 and carry rods 37 that extend along the inner sides of the bar 25 and slide in apertures in the flanges 33 of the brackets 31. Coil springs 38 surrounding the rods 37 are interposed between the brackets 31 and 36 and normally cause the bead supporting annulus to travel with the annulus 24. However, when the inward movement of the bead supporting annulus is impeded, the springs 38 will yield and permit the annulus 24 to advance beyond the annulus 34. In applying the bead ring the inward movement of the annulus 34 is stopped when the bead ring is pressed against an inwardly projecting bead positioning flange 39 on the end of the drum and the bead ring is held against the flange 39 with an increasing pressure as the annulus 24 is advanced over the end of the drum and the springs 38 are compressed. The annulus 24 carries a smoothing ring 40 in the form of an endless coil spring, which is normally of a diameter less than that of the drum, but which is adapted to be expanded to conform to the periphery of the drum upon movement over the drum shoulder. The ring 40 is supported by a series of circumferentially spaced, radially disposed links 41 that are pivoted at their outer ends to the interior of the annulus 24 to swing axially. The ring 40 serves to press down portions of the fabric overlying the shoulder portion of the drum. The springs 38 are of considerable length so that the movement of the annulus 24 over the end of the drum does not cause an excessive pressure to be exerted upon the bead by the annulus 34.

For folding the end edges of a band of fabric on the drum inwardly over the shoulders of the drum, each head is provided with a contractible endless coil spring folder ring 42 that is adapted to be expanded to a dimeter greater than that of the drum, and to be placed over an end portion of a fabric band that projects beyond the end of the drum and then contracted to fold the fabric inwardly over the drum shoulder. The contractible endless coil spring ring 42 is carried by axially extending arms 43 that are rigidly attached to the outer ends of radial bars 44 that are slidably mounted in radially disposed dovetail slots 45 in the outer face of a disk 46 that is slidably mounted on the sleeve 4. Suitable means is provided for simultaneously imparting radial outward movements to the ring supporting arms 43 to expand the ring 42 to a diameter greater than that of the drum. This movement is accomplished by means of a series of identical toggles, each consisting of an inner radially disposed link 47 pivoted to the hub of the disk 46 and an outer radially disposed link 48 pivoted to the outer end of one of the arms 43. The toggle links 47 and 48 are connected at their outer and inner ends, respectively, by pivots 49 and 50 to the inner ends of elongated axially extending actuating plates 51, which are pivotally connected at their outer ends to a disk 52 that is mounted to slide axially upon a sleeve 53 that slides on the sleeve 4. The movement of the disk 52 on the sleeve 53 is limited by a collar 54 on the outer end of the sleeve and by a flange 55 at the inner end of the sleeve. Movement may be imparted to the disk 52 by engagement of the collar 54 or flange 55 therewith when the sleeve 53 is shifted axially on the sleeve 4. The disk 46 is moved toward and away from the end of the drum by means of axially extending rods 56 attached to the disk and extending through the inner and outer walls of the housing 2 and pivotally connected to crank arms 57, attached to a horizontal shaft 58 mounted in brackets 59 attached to the outer wall of the housing 2. The sliding sleeve 53 is moved axially on the sleeve 4 by means of rods 60 attached to the collar 54, extending axially through the mechanism housing 2 and pivotally connected to crank arms 61 attached to a sleeve 62, rotatably mounted on the shaft 58.

The initial step in the building of a tire by the method of the present invention consists in applying a band of fabric composed of a plurality of plies to the periphery of the drum. The fabric is applied to the drum in the usual and conventional manner and the width of the fabric band so applied is greater than the length of the drum, so that the edges of the band project a substantial distance beyond each end of the drum. The projecting ends of the fabric are then folded in against the ends of the drum by means of the contractible rings 42, after which the bead ring is pressed against the fabric overlying the flange 39 of the drum, and is held in place by the attachment of a fabric flipper strip carried by the bead ring to the fabric on the periphery of the drum.

After the bead ring is secured in place against the fabric on the shoulder of the drum, the portion of the inwardly extending flange of fabric that projects past the interior of the bead ring is folded axially across the interior of the bead ring and radially outwardly over the outer face of the bead ring. The latter folding operations are performed by means of a disk assembly that is mounted to move axially into and out of the end of the drum. This disk assembly is supported upon a disk 63 that slides on the sleeve 4 and comprises outer, inner and intermediate expansible disks 64, 65 and 66, each of which is composed of radially movable segments. The disks 64, 65 and 66 are held in place between the main disk 63 and an inner retaining plate 67 that is secured to and spaced inwardly from the disk 63. The outer expansible disk 64 bears against the inner face of the disk 63 and the inner expansible disk 65 has an offset inner portion 68 that bears against the disk 64. The segments of the inner expansible disk 65, with their outer portions offset inwardly from the disk 64 provide a space between the outer portions of the disks 64 and 65 in which the intermediate expansible disk 66 is mounted, the disk 65 having a shoulder 69 lying within the annular disk 66.

Radial movements are imparted to the segments of the disk 64 by means of radially swinging links 70 that are pivoted at their outer ends to lugs 71 on the outer faces of the disk 64, and at their inner ends to lugs 72 on a collar 73 that is slidably mounted on the sleeve 4. Movements of the collar 73 axially toward or away from the disk 63 causes the segments of the disk 64 to be simultaneously moved radially outwardly or inwardly to expand or contract the disk.

The disk 63 is moved axially by means of a pair of rods 74 that extend axially and have reduced outer ends 75 that are telescopically received in the tubular ends of alined rods 76 as shown in Fig. 6. The reduced end 75 of each rod 74 carries a pin 78 that engages in a longitudinal slot 79 in the tubular end of the rod 76 and a coil spring 80 surrounds the reduced portion 75 between the rod 76 and the shoulder on the rod 74 at the inner end of the reduced portion 75. The rods 76 are pivotally connected to crank arms 81 attached to a horizontal shaft 82 mounted on the inner wall of the housing 2. Rocking movement of the shaft 82 moves the disk 63 inwardly or outwardly with respect to the drum, through the telescopically connected rods 74 and 76, the spring 80 permitting relative movement between the rods 74 and 76 so that a gradually increasing pressure may be applied to the disk 63 when inward movement thereof is impeded.

The collar 73 is connected by tie rods 83 to a collar 84 mounted on the sleeve 4, outwardly of the slidable sleeve 53, the tie rods 83 extending through the disks 63 and 52 and the collar 54, as shown in Fig. 3. Collars 73 and 84 are shifted axially by means of rods 85 attached to the collar 84 and to crank arms 86 on a sleeve 87 that is rotatably mounted on the horizontal shaft 82, as shown in Fig. 6. By actuation of the crank arms 86, the collar 73 may be moved axially toward or away from the disk 63 to expand or retract the outer disk 64.

Inwardly of the inner portion 68 of the expansible disk 65, a ring 88 is secured to the disk 63 by means of bolts 89, as best shown in Figs. 7, 8 and 9. The bolts 89 are secured to the disk 63 and extend through arcuate slots 90 in the ring 88, so that the ring 88 may have a limited turning movement on the disk 63. The ring 88 has gear teeth 91 formed on a portion of its outer periphery. These teeth mesh with a pinion 92 that is keyed to a shaft 93 that extends axially, the pinion 92 having a hub 94 journaled in the disk 63. The hub 94 projects outwardly through the disk 63 and carries a collar 95 that bears against the outer face of the disk to hold the pinion in mesh with the teeth 91 and against the inner face of the disk 63. The collar 95 is secured to the hub and the hub to the shaft 93 by means of set screw 96 threaded in the collar 95 and hub 94 and bearing at its inner end against the shaft 93. The shaft 93 has a squared outer end 97 that slidably fits in the hub 98 of an actuating arm 99 that is operated by the plunger 100 of a fluid pressure cylinder 101, the hub 98 being journaled in a fixed bearing member 102 and being held against endwise movement with respect to the bearing member by a shoulder 103 and a collar 104 that engage with opposite sides of the bearing member.

Turning movements of the ring 88 imparted thereto by the fluid pressure cylinder 101 through the arm 99, shaft 93 and pinion 92, serve to impart radial movements to the segments of the inner disk 65, the ring 88 being connected to the segments of the disk 65 by means of links 105 that are inclined with respect to radial lines, the inner ends of the links being connected to the ring 88 by axially disposed pivots 106 and to the segments of the disk 65 by means of axially disposed pivots 107. The links 105 overlie the inner faces of the ring 88 and the inner offset portion 68 of the ring 65, lying substantially in the plane of the outer portions of the disk 65, as shown in Fig. 8.

The inner retaining plate 67 is attached to the disk 63 by means of bolts 108 that extend through slots 109 in the disk 64, slots 110 in the disk 65 and slots 111 in the disk 66. Two bolts 108 are provided for each segment of the disk and the slots 109, 110 and 111 are disposed parallel to the central radial lines of the segments, so as to properly guide the radial movements of the segments. The segments of disks 64 and 65 are guided by additional bolts 112 that are arranged in pairs, each pair extending through registering slots 113 in the disk 64 and in the inner portion 68 of the disk 65.

The intermediate, expansible disk 66 is composed of segments that are individually pressed outwardly by coil springs 114 mounted in recesses 115 in the segments of the disk 66 and bearing against the shoulder 69 on the inner disk 65. The extent of movement of the segments of the disk 66 with respect to the inner disk 65 is limited by pins 116 secured to segments of the disk 66, which engage in recesses 117 in the outer faces of the segments of the disk 65, as best shown in Fig. 10.

*The initial bead forming operations*

By means of the devices above described, which are duplicated in the head C, the bead rings may be built into a fabric tire carcass on the drum A, the operations performed at opposite ends of the drum being identical and these operations being performed simultaneously. The sequence of operations by which a bead ring is incorporated into the tire carcass is illustrated in Figs. 11 to 18 of the drawings. At the stage in the cycle of operations shown in Fig. 11, a fabric band D consisting of a plurality of plies of fabric has been applied to the periphery of the drum A, the band D being of a width to project a substantial distance beyond the ends of the drum, and a bead ring E with an attached flipper strip F has been mounted upon the seat 35 of the bead applying annulus 34. The disk 46 has been positioned between the annulus 34 and the end of the drum and the fabric folding ring 42 has been expanded from the position shown in dotted lines in Fig. 11 to the position shown in full lines, the expansion of the ring 42 having been effected by movement of the sleeve 53 and disk 52 from the dotted line position to the full line position in Fig. 11.

After the ring 42 has been expanded as shown in Fig. 11, the disk 46 is moved inwardly toward the drum A by means of the rods 56, to the position shown in Fig. 12. The sleeve 53 is held stationary in the position shown in Fig. 11 during the inward movement of the disk 46, and the disk 52 slides inwardly on the sleeve 53 to a position adjacent the flange 55 when the ring 42 is brought to the position shown in dotted lines in Fig. 12. The sleeve 53 is then moved outwardly to engage the flange 55 with the disk 52 and pull the links 47 and 48 of the toggle out of alignment so that the tension of the spring ring 42 snaps the ring to its contracted position shown in full lines in Fig. 12, moving the arms 43 radially inwardly, swinging the links 47 and 48 outwardly, and moving the disk 52 outwardly toward the collar 54 on the sleeve 53. The ring 42 is thus caused to snap inwardly against the exterior of the edge portion of the fabric band D, engaging the band simultaneously throughout the circumference thereof and folding the fabric inwardly over the end of the drum. It should be noted that in folding the fabric over the end of the drum, the engagement of the folding ring 42 with the fabric is entirely beyond the end of the drum, so that there is no pressure exerted through the fabric against the drum shoulder. When the edge portion of a cylindrical band of fabric is forced inwardly to form an inwardly extending flange, the fabric must wrinkle or shrink to compensate for the reduction in circumference. By engaging the fabric beyond the end of the drum simultaneously throughout its circumference within a uniformly contracting ring such as the ring 42, stresses are set up in the fabric tending to crowd the cords of the fabric together and the fabric overlying the drum shoulder and flange is free to uniformly accommodate and adjust itself to its contracted form so that wrinkling of the fabric overlying the bead positioning flange is avoided.

The above described method of and apparatus for folding the ends of a fabric band over the end shoulders of a tire building drum is claimed per se in my copending application Serial No. 769,862, filed August 21, 1947.

While the folding ring 42 remains in the position shown in Fig. 12 engaging the fabric flange and holding it against outward movement the connecting rods 28 are actuated to slide the bars 25 and annulus 24 axially toward the end of the drum. The bead carrying annulus 34 moves with the annulus 24 until the bead ring E is brought into engagement with the fabric overlying the flange 39 of the drum, whereupon the movement of the annulus 34 is stopped and the bead ring E is pressed against the fabric as shown in Fig. 13. Continued movement of the annulus 24 compresses the spring 38 and applies increasing pressure to the bead ring E.

As the ring 24 moves over the periphery of the drum as shown in Fig. 14, the spring ring 40 is dragged over a flipper strip F attached to the bead ring E and presses the same against the fabric band D lying on the drum shoulder and upon the periphery of the drum adjacent the shoulder, as illustrated in Fig. 14. After the flipper strip has been stitched down upon the fabric the annulus 24 is retracted and carries with it the bead applying annulus 34 to the position shown in Fig. 15.

As the annulus 24 is moved outwardly, the rods 74 and 85 are actuated to shift the disk 63 and collar 73 outwardly simultaneously to move the disk assembly outwardly and to fold the fabric flange against the interior of the bead ring E, as shown in Fig. 15, the disks 64 and 65 of the assembly being in retracted position and the external diameters of the disks being slightly less than the internal diameter of the bead rings, so that the free edge of the fabric band is folded against the interior of the bead ring as the disks are moved across the interior of the bead ring. The outer disk 64 has a beveled peripheral edge 118, for engagement with the fabric during the outward folding operation.

After the disk assembly has been moved to the position shown in Fig. 15, the collar 73 is moved outwardly toward the disk 63 by continued movement of the actuating rods 85 to move the segments of the disk 64 radially outwardly to fold the fabric against the outer face of the bead ring E as shown in Fig. 16, the disk 64 having an inner peripheral beveled edge 119 for engagement with the fabric during the outward folding movement. After the folding operation shown in Fig. 16, the rods 74 are actuated to pull the disk assembly outwardly clear of the drum and to retract the disk 64.

With the disk assembly positioned outside the drum, the annulus 24 is again actuated by the connecting rods 28, to move the smoothing ring 40 over the shoulder of the drum to press the free edge of the fabric band against the flipper strip F outwardly of the bead ring E, as shown in Fig. 17. The annulus 24 is then retracted to the position shown in Fig. 18.

After the bead rings have been built into the tire carcass fabric and after the bead forming elements have been positioned clear of the drum as shown in Fig. 18, the mechanisms of the bead building heads are stopped, and external plies of fabric and rubber are applied to the band previously formed on the tire building drum.

*Application of the outer plies and rubber covering*

The external fabric plies are built up upon the inner fabric plies in the usual manner by rotating the drum and winding the strips of fabric forming the successive plies upon the drum. The fabric plies as shown in Fig. 19 comprise a suitable number of full width plies a, a breaker strip b and chaffer strips c. The external rubber covering of the tire is formed by a strip of rubber stock G that has a thickened tread portion m provided with a concave face n and inclined shoulder portions p, together with side wall covering portions r that gradually decrease in thickness toward the edges of the strip.

As shown in Fig. 26, a strip of rubber stock G that is cut to the proper length to form the covering of the tire is fed to the tire building drum from a suitable support such as a table 120 mounted at the front of the machine. Viewed as in Fig. 26, the drum A is rotated in a clockwise direction and the strip G passes from the table 120 to the under side of the drum A where it is engaged by a set of compression rollers which as shown in Fig. 21, comprise two deformable end rollers 121 and a center roller 122 that has a transversely convex periphery, the deformable rollers 121 engaging the side wall portions r of the rubber covering and the concave center roller engaging the concave face n of the thickened tread portion.

Rearwardly of the pressure rollers, stitching rollers 123, 124 and 125 are provided at each end of the drum that serve to press the edge portions of the strip G and of the fabric plies against the inner layers of fabric adjacent the beads, and to fold the fabric inwardly against the outer faces of the beads. To the rear of the stitching rollers there are a pair of shoulder engaging pressure rollers 126, adapted to engage the tread shoulder portions p.

The pressure rollers 121 and 122 are mounted upon a transverse shaft 127 and each of the deformable rollers 121 has a yieldable periphery formed by a series of annular disks 128 that are mounted side by side for relative radial movements throughout the length of the roller. The annular disks 128 are mounted upon a soft rubber core 129 of star shape that has projecting tips 130 upon which the annular disks 128 are seated. The disks 128 are confined between end plates 131 which engage the ends of a cylindrical sleeve 132, upon which the rubber core 129 is mounted. The transversely convex periphery of the roller 122 fits the concave face n of the tire tread, and the periphery of this roller has closely spaced V-shaped ribs 133 formed between closely spaced V-shaped circumferential grooves in the periphery of the roller. The rollers 121 and 122 are rotatably mounted upon the shaft 127, and are turned during operation by frictional engagement with the stock on the tire building drum.

As shown in Figs. 1 and 26, the shaft 127 is supported upon the outer ends of a pair of arms 134, that are keyed at their inner ends to a shaft 135, which is non-rotatably secured at its ends to the outer ends of arms 136 that are pivoted at their inner ends to a horizontal shaft 137, journaled in posts 138 mounted on the base 1 rearwardly of the drum. The arms 134 and 136, together with the shafts 127 and 135 form a rigid supporting frame that swings vertically about the horizontal shaft 137 to move the pressure rollers 121 and 122 into and out of engagement with stock on the tire building drum.

Immediately to the rear of the pressure rollers 121 and 122, the arms 134 are connected by a rigid cross bar 139, the bottom face of which contacts with a roller 140 on the upper end of a plunger 141 that operates in a vertically disposed cylinder 142 mounted on the base 1. The cylinder 142 is adapted to receive air under pressure to force the plunger 141 upwardly to engage the rollers 121 and 122 with material on the drum A, and to maintain a pressure upon these rollers. The inclination of the bottom face of the bar 139 is such that this face is substantially horizontal when the rolls are brought into engagement with the stock being fed to the tire building drum, so that pressure may be effectively applied to the roller by the plunger 141. It will be noted that the rollers 121 are disposed forwardly of the central vertical plane of the drum, so that pressure of these rollers against the incoming strip G maintains a tension on the strip as it is applied to the drum. Shrinkage of the cover stock during storage prior to use shortens the strip and thickens the tread forming portions thereof, so that it is difficult to properly adhere the side wall covering portions to the fabric and difficult to properly splice the ends of the strip together. By properly regulating the tension exerted on the strip by the roller 122 during its application to the fabric on the drum, the strip G may be caused to be uniformly adhered to the underlying fabric throughout the width and circumference of the tire, and the stock may be stretched exactly to the extent necessary to obtain the proper engagement of the skived ends of the strip.

As shown in Figs. 20, 23 and 24, the stitching rollers 123, 124 and 125 have toothed flanges 143, which engage with the outer plies of fabric along the shoulders of the drum. Each of the rollers 123, 124 and 125 is mounted upon a threaded shaft 144 that is screwed into a supporting spider that has three integral arms 145, 146 and 147. As shown in Fig. 20, the roller 123 is mounted at the outer end of the arm 145, the roller 124 is mounted at the juncture of the three arms 145, 146 and 147 and the roller 125 is mounted at the outer end of the arm 146. The shafts 144 are secured in adjusted positions by means of nuts 148 on the shafts 144 that screw into engagement with the supporting spider and the lower end of the arm 147 of the spider is pivotally mounted on a horizontal supporting shaft 149. The pivotal movement of the arm 147 on the shaft 149 is limited by a pair of stops 150 carried by a collar 151 fixed to the shaft 149 and positioned in the path of the arm 147. The shaft 149 is carried by the outer ends of lever arms 152 that are pivoted intermediate their ends to the shaft 137 and the upper end of a plunger 153 is also pivotally connected to the shaft 149, the plunger 153 being mounted in a fluid pressure cylinder 154 connected to the base 1 by a horizontal pivot 155. By means of the cylinder 154, the stitching rollers may be moved upwardly into engaging position and pressed against the shoulder of the drum. Pivotal movements of the arm 147 permit the stitching rollers to adjust themselves to the drum and equalize the pressure of the rollers against the drum. The arm 147 is normally yieldingly held in engagement with the rear stop 150 by a coil spring 156 that is connected at one end to the outer end of the arm 146 and at the other end to an arm 157 attached to the collar 151. The rear stop 150 is so positioned that the spring 156 holds the rollers supporting spider in a position such that the roller 123 is first engaged with the stock on the drum when the shaft 149 is elevated so that pressure on the roller 123 rocks the rollers 124 and 125 into engaging position. The stops 150 are so positioned that the arm 147 is substantially midway between the stops during engagement with the fabric on the drum, so that the roller support is free to rock in either direction to equalize the pressure on the rollers. As shown in Figs. 23 and 24, the front roller 123 has a shoulder portion 158 that bears against the edge of the rubber cover strip G inwardly of its flange 143. The intermediate roller 124 is offset axially outwardly with respect to the roller 123 and its flange engages the outer chaffer strip and presses the same radially inwardly against the bead, while the roller 125 is offset axially outwardy with respect to the roller 124 and positioned with its axis at an inclination to the drum axis and with its flange 143 pressing against the outer face of the tire bead. The teeth of the stitcher rollers engage the fabric at closely spaced points and cause the disks to turn with a peripheral speed equal to that of the fabric surface that is engaged, thereby avoiding slippage and wiping action that would tend to wrinkle the fabric.

As shown in Figs. 25 and 26, the rollers 126 are of conical form so that their peripheries conform to the inclined tread shoulders p which were not engaged by the rollers 121 and 122. Both rollers 126 are slidably mounted upon a horizontal shaft 159 that is mounted on the lower ends of lever arms 160 pivoted intermediate their ends to a shaft 161 extending between the upper ends of the posts 138. The lever arms 160 are operated to move the rollers 126 into engagement with stock on the tire building drum by means of chains 162 extending over toothed segments 163 at the upper ends of the arms 160 and attached to the same adjacent their lower ends by pins 164. The opposite ends of the chains 162 are attached to the rear ends of the lever arms 152 so that the rollers 126 as well as the rollers 123, 124 and 125 are moved toward the drum by means of the fluid pressure cylinder 154. When the plunger 153 is actuated, the forward end of the lever 152 is moved upwardly and carries the stitching rollers 123, 124 and 125 into engaging position. At the same time the rear end of the lever 152 moves downwardly, exerting a pull on the chain 162 that swings the lever 160 forwardly and upwardly to press the rollers 126 into engagement with the tread portion of the tire on the drum. As shown in Fig. 25, the rollers 126 are mounted on ball bearings 165, which have inner races 166, slidable on the shaft 159. The inward movement of the rollers 126 is limited by stops 167 secured to the shaft 159 and the rollers are yieldingly pressed toward the stops 167 by coil springs 168 that are interposed between collars 169 attached to shaft 159 and disks 170 that are slidable upon the shaft and in engagement with the races 166. During operation a yielding inward pressure is applied by the springs 156 to the rollers 126, so as to hold the rollers in engagement with the inclined portions p of the tire tread, the springs permitting the rollers 126 to accommodate themselves to treads of varying widths.

In applying the cover stock G to the fabric on the drum only the pressure rolls 121 and 122 are engaged with the stock, the delivery of pressure to the cylinders 142 and 154 being so controlled that the rolls 121 and 122 only are pressed against the stock. When the drum has nearly completed its revolution and the attached end of the stock is approaching the pressure rollers, the drum is stopped and then turned in a reverse direction until the ends to be spliced are brought up to a convenient position for the operator to manually join the ends together. When starting with a new batch of cover stock the drum may be intermittently actuated toward the end of its rotation to slow down the operation sufficiently to enable the operator to regulate the pressure applied to the cylinder 142 in such manner as to impart the stretch necessary to cause the skived ends of the stock to come together in the proper abutting relation.

After the application of the cover stock to the fabric on the drum the stitching rollers 123, 124 and 125 and the shoulder engaging pressure rollers 126 are pressed against the stock on the drum while the drum is being rotated through three or four revolutions. The pressure rollers 121, 122 and 126 press the rubber cover stock against the outer ply of fabric and press the fabric plies together to cause the plies of fabric and the cover stock to firmly adhere. At the same time the stitching rollers 123, 124 and 125 press the fabric plies against the outer faces of the beads and against the underlying fabric plies outwardly of the beads.

The above described mechanism for applying the outer fabric plies and rubber covering to the inner fabric plies on the drum is claimed per se in my copending application Serial No. 581,873, filed March 9, 1945.

Final bead building operation

After the outer covering has been applied to the carcass on the tire building drum, the free edges of the base strip a and chaffer strips c that extend past the interior of the tire bead are folded inwardly against the interior of the bead, this final folding operation being performed by the mechanism of the bead building heads. This folding operation is accomplished by moving the disk 63 inwardly toward the tire building drum, by means of the actuating rods 74, while the collar 73 is held against movement. The movement of the disk 63 toward the collar 73 causes the disks 65 and 66 to engage the edge portion of the fabric overlying the bead, move into the tire bead opening and fold the fabric inwardly across the interior face of the bead as shown in Fig. 27. The collar 73 is held stationary during this movement of the disk 63 so that the segments of the outer disk 64 are moved radially outwardly and the inner face of the disk 64 is pressed against the outer face of the tire bead. The engagement of the disk 64 with the tire bead impedes the movement of the disk 63, causing the rods 76 to compress the springs 80 and apply gradually increasing pressure against the outer face of the bead. After the application of pressure to the outer face of the bead, the collar 73 is moved inwardly to retract the disk 64 and pressure is automatically supplied to the cylinder 101 to turn the pinion 92 to expand the inner disk 65 against the interior of the bead to press the free edge of the fabric against the interior of the bead. The disk 65 has a beveled periphery 171 which engages with the free edges of the fabric layers to press the edges tightly together and to the fabric of the base plies. A relatively high pressure is applied radially outwardly against the edges of the outer fabric plies by the segments of the disk 65 to firmly adhere them to the interior of the bead and this pressure is applied while the disk 64 is held against the outer face of the bead, and while the segments of the intermediate disk 66 bear against the interior of the bead so that the bead is not distorted by the pressure so applied.

The affixing of the edges of the outer fabric plies to the interior of the bead completes the tire building operations and is followed by the shifting of the disk 63 and collar 73 to a position clear of the drum and the shifting of the movable head away from the drum to permit collapse of the drum and removal of the completed tire.

Bead ring positioner

After a completed tire has been removed from the drum, bead rings E with flipper strips F attached thereto, are mounted upon the seats 35 of the annuli 34 preparatory to building another tire. The bead ring can be readily placed upon the seat 35 of the stationary head by passing it through the space between the shaft 7 and the drum, and endwise over the drum while the head C is retracted, and the corresponding bead ring can be placed upon the annulus 34 of the movable head while the shafts 3 and 7 are separated.

The annulus 34 is in the form of a rigid ring and its bead ring seat 35 is of a diameter to fit within the bead ring E. To facilitate the placing of the bead ring E on the seats 35, the disk 46, as best shown in Figs. 29 and 30, has four or more angularly spaced brackets 172 attached thereto adjacent its periphery and these brackets have radially outwardly extending arms 173 that carry pivots 174 for a series of fingers 175 that are in the form of flat plates adapted to rest upon the outer faces of certain of the arms 43 when these arms are in their retracted positions. The pivots 174 are so located that the outer faces of the fingers 175 lies lightly within the periphery of the seat 35 so as to provide a temporary bead ring seat that is small enough in diameter to permit the ring to be quickly and easily placed thereon. After a bead ring has been placed upon the fingers 175 as shown in Fig. 29, the fingers 175 will be swung outwardly by the arms 43 as these arms are moved radially outwardly to expand the ring 42 at the beginning of the bead building operation. The simultaneous outward swinging movement of the plates 175 expands them against the interior of the bead ring and tilts them toward the bead seat 35 so as to move the ring laterally onto the seat 35 in position to be applied to the fabric on the drum. The transfer of the bead ring E to the seat 35 occurs at the beginning of the outward movement of the arms 43, illustrated in Fig. 11.

The bead ring positioning device above described is claimed per se in my copending application Serial No. 709,608, filed November 13, 1946.

*Actuating and timing mechanism of bead building heads*

In the operation of the machine, the application of plies of fabric and rubber to the tire building drum A alternate with the bead building operations performed by the mechanisms carried by the heads B and C. The operation of the bead building mechanism is stopped during the operation of the tire building drum and associated devices to apply the fabric plies and rubber cover stock to the drum, but the operations of the bead building elements are automatically controlled and occur in a definite sequence and in a predetermined timed relation.

All of the actuators for the moving parts of the bead building head are actuated by the shaft 15 and the connections from shaft 15 to the various movable actuators are such that the operations are performed in the desired sequence during one revolution of shaft 15.

Referring particularly to Figs. 6 and 31, the shaft 15 has a large gear 176 attached thereto adjacent its forward end, that meshes with a small gear 177 rotatably mounted on the shaft 30. The gears 176 and 177 are Geneva gears, the gear 176 rotating with the shaft 15 and having spaced groups of teeth that engage teeth on the gear 177, and the gear 177 having lobes that are formed to slide on the smooth arcuate portions of the gear 176 intermediate the groups of teeth so that partial revolutions are imparted to the small gear 177 during the rotation of the large gear 176. The gear 177 carries an eccentric 178 that has a strap 179 carrying an actuating rod 180 that extends through the outer wall of the housing 2 and is connected to a crank 181 attached to the shaft 58. Inwardly of the gear 176, a second Geneva gear 182 is fixed to the shaft 15 and meshes with a small Geneva gear 183 rotatably mounted on the shaft 30. The gear 183 carries an eccentric 184 that turns within a strap 185 attached to an axially extending rod 186 that is pivotally connected to a crank 187 attached to the sleeve 62 on the shaft 58. A third large Geneva gear 188 fixed to the shaft 15 meshes with a small Geneva gear 189 rotatably on shaft 30, the gear 189 carrying an eccentric 190 that actuates a strap 191 carrying a rod 192 that extends inwardly to a crank arm 193 attached to the shaft 82 that is mounted on the inner wall of the housing 2. A fourth large Geneva gear 194 fixed to the shaft 17 meshes with a small Geneva gear 195 rotatable on shaft 30, the gear 195 carrying an eccentric 196 that operates a strap 197 and rod 198 that is attached to a crank arm 199 carried by the sleeve 87 on the shaft 82. In the rear portion of the housing, the shaft 15 carries a large Geneva gear 200 that meshes with a small Geneva gear 201 that is fixed to the shaft 30.

As shown in Fig. 32, the gear 177 has diametrically opposite lobes 202 that have concave faces adapted to slide on the cylindrical periphery of the gear 176 intermediate the groups of teeth on the gear. The gear 177 has two groups of gear teeth 203 diametrically opposite one another and occupying the spaces between the lobes 202. As herein shown, the gear 177 has a group of seven teeth 203 on each side thereof, each group being adapted to mesh with a group of eight teeth on the perpihery of the gear 176 to impart a one-half revolution to the gear 177 upon the passage of each of the groups of gear teeth upon the gear 176, the lobes 202 serving to lock the gear 177 against turning movements during the passage of smooth portions of the periphery of the gear 176. The gears 183 and 195 that mesh with the large gears 182 and 194 are two lobed gears, identical with the gear 177 shown in Fig. 32.

The gear 189 that meshes with the gear 188 is shown in Fig. 33 of the drawings, and has diametrically opposite lobes 204 and 205, adapted to slide on smooth portions of the gear 188 and two additional lobes 206 and 207 that are spaced from the lobe 204 by three teeth receiving recesses 208, and from the lobe 205 by a single tooth receiving recess 209.

The small gear 201 shown in Fig. 34 is a single lobed Geneva gear which has a single locking lobe 211 and nineteen gear teeth 212 formed in the remainder of its periphery.

Referring to Fig. 35 in which the peripheries of the large Geneva gears 176, 182, 188, 194 and 200 are developed in the plane of the sheet, it will be seen that the gear 176 has two spaced groups of teeth 213 and 214 of eight teeth each to mesh with the teeth 203 on the gear 177 and impart a one-half revolution to the gear 177. The gear 182 has two spaced groups of teeth 215 and 216 of eight teeth each to mesh with the spaced groups of teeth 203 on the gear 183, which is identical with the gear 177. Progressing from right to left in Fig. 35 the gear 188 has a group of three teeth 217, a single tooth 218, a second single tooth 219, a group of three teeth 220, a second group of three teeth 221, two spaced single teeth 222 and 223 and a fourth group of three teeth 224. The gear 194 has spaced groups of eight teeth each, 225, 226, 227 and 228 that mesh with the teeth 203 on the gear 195, which is identical with the gear 177 shown in Fig. 32. Gear 200 has spaced groups of teeth 229 and 230 of twenty teeth each that mesh successively with the teeth 212 of the gear 201, each imparting a complete revolution to the gear 201.

The portions of the peripheries of the large gears shown in Fig. 35 at the right-hand end of said figure are directly beneath the shaft 30 at the beginning of the tire building operation, and, during a revolution of the shaft 15, the movement of the peripheries shown in Fig. 35 is to the right. Since all of the large gears are fixed to the shaft 15 and rotate simultaneously, the successive operations of the cycle performed during one revolution of the shaft 15 are caused by the passage of the groups of gear teeth on the large gears beneath the Geneva gears on the shaft 30 and the timing and sequence of the operations is indicated by the positions of the groups of gear teeth, assuming that the developed peripheries of the gears are moved endwise toward the right and engage with the small Geneva gears at the right hand end of Fig. 35.

The first operations are those caused by the engagement of the group of teeth 225 on the gear 194, with the teeth on the gear 195 and the gear teeth 217 and 218 with the tooth spaces 208 and 209 of the gear 189. The teeth 225 impart a one-half revolution to the gear 195 while the teeth 217, together with the adjacent single tooth 218, impart substantially simultaneously a one-half revolution to the gear 189. The gear 195 imparts an inward movement to the rods 85 through the eccentric rod 198, crank 199, sleeve 87 and cranks 86, to move the collars 84 and 73 simultaneously toward the drum. Simultaneously the gear 189 moves the telescopically connected rods 74 and 76 inwardly toward the drum through the eccentric rod 192, crank arm 193, shaft 82 and cranks 81, moving the disk 63 into the end of the drum A simultaneously with the collar 73, so that the disk assembly carried by disk 63 is moved into the drum without expanding any of the disks. This initial operation of the actuating mechanism takes place upon starting the motor 19 at the beginning of the tire building operation, and brings the folder disks to the position shown in Fig. 11 of the drawings.

Immediately after the disk assembly has been moved into the drum, the group of teeth 215 on gear 182 impart a one-half revolution to the gear 183 to push the rods 60 inwardly toward the drum through the action of the eccentric rod 186, crank arm 187, sleeve 62 and crank arms 61, to shift the sleeve 53 toward the drum and toward the disk 46, to push the toggle links 47 and 48 into alignment so as to expand the folder ring 42 and hold it in expanded position as shown in full lines in Fig. 11. Immediately after the folder ring 42 has been expanded, the group of teeth 213 on the gear 176 impart a one-half revolution to the gear 177, to move the rods 56 inwardly toward the drum by the action of the eccentric rod 180, crank 181, shaft 58 and cranks 57 on shaft 58, to push the disk 46 toward the drum and to bring the folder ring 42 to a position surrounding the fabric band D beyond the end of the drum, as shown in dotted lines in Fig. 12.

Immediately after the folder ring has been positioned around the projecting edge of the fabric, the group of teeth 216 on gear 182 turn the gear 183 through a second one-half revolution, causing the eccentric rod 186 to move inwardly and retract the rod 60 and move the sleeve 53 outwardly away from the drum, so that the flange 55 of the sleeve will engage the disk 52 and pull it outwardly to break the toggle formed by links 47 and 48, so that spring 42 is allowed to spring back to its smaller diameter snapping the projecting edge of the fabric cylinder inwardly over the shoulder of the drum to form an inwardly projecting flange of fabric, as shown in Fig. 12 of the drawing.

After the edge of the fabric has been folded inwardly, the group of teeth 229 on the gear 200 come into engagement with the teeth on the gear 201, imparting a full revolution to the gear 201 and the shaft 30 to which it is keyed. This revolution of the shaft 30 causes the connecting rods 28 to slide the bars 25 toward the end of the drum, carrying the bead applying annulus 34 into engagement with the fabric flange overlying the flange 39 of the drum, to press the bead ring E against the fabric as shown in Fig. 13. Continued movement of the bars 25 and annulus 24 drags the smoothing ring 40 over the flipper strip F to press the same against the fabric D on the drum. During the second half of each revolution the shaft 30 returns the annulus 24 and the bead applying annulus 34 to their retracted positions. During the return movement of the annuli 24 and 34, the group of teeth 214 on the gear 176 imparts a second one-half revolution to the gear 177 to retract the rods 56 and move the disk 46 and folder ring 42 back away from the drum.

Before the completion of the second half of the revolution of the shaft 30, the group of teeth 226 turns the gear 195 through a second one-half revolution, to move the collar 73 outwardly. At the same time the single tooth 219 on the gear 188 imparts a lesser turning movement to the gear 189, to move the disk 63 outwardly a lesser distance, and to hold the same against movement while the collar 73 moves to its outermost position. The combined action of the gears 189 and 195 is to first move the disk assembly outwardly to a position part way out of the drum to fold the edge of the fabric flange outwardly against the interior of the bead ring E, as shown in Fig. 15 of the drawings. The single tooth 219 shifts the disk 63 to the position shown in Fig. 15, after which the gear 189 is held against movement and the disk 63 is retained in the position shown in Fig. 15. The continued movement of the gear 195 causes the collar 73 to move outwardly to the position shown in Fig. 16, expanding the segments of the disk 65 to fold the edge of the fabric outwardly against the outer face of the bead, as shown in Fig. 16.

Immediately after the shaft 30 completes its first revolution, the teeth 230 on the gear 200 impart a second revolution to the shaft, to again advance the annulus 24 over the end of the drum A. During this revolution of the shaft 30, the group of teeth 229 on the gear 188 complete the second one-half revolution of the gear 189 to shift the disk 63 to its outermost position, as shown in Fig. 17. The second rotation of the gear 201 causes the annulus 24 and smoother ring 40 to be advanced over the shoulder of the drum and to press the edge of the fabric against the shoulder of the drum outwardly of the bead ring E, as shown in Fig. 17. The second half of the second revolution of the shaft 30 moves the annulus 24 and the parts movable therewith, to their retracted positions shown in Fig. 18, which completes the initial bead building operation. The motor 19 is then stopped and the drum A is operated to apply the outer plies and outer rubber covering of the tire, as illustrated in Figs. 19 to 26 of the drawings.

After the cover stock has been applied to the drum, a portion of the rubber and fabric projects inwardly past the bead, as shown in Fig. 27. To apply this projecting edge portion of the fabric to the interior of the bead the motor 19 is again started into operation, whereupon the group of teeth 221 on the gear 188 impart a partial revolution to the gear 189, to move the disk 63 inwardly toward the collar 73, causing the segments of the disk 64 to be moved radially outwardly. The group of teeth 227 on the gear 194 then impart a one-half revolution to the gear 195, to move the collar 73 inwardly and retract the segments of the disk 64.

The initial inward movement imparted to the disk assembly causes the outer layers of fabric to be folded inwardly across the interior of the bead, while the inner face of the expanded disk 64 is brought into pressing engagement with the fabric overlying the outer face of the bead. Before the collar 73 is moved inwardly to retract the segments of the disk 64, fluid pressure is delivered to the cylinder 101 to expand the disk 65 and press the edges of the fabric against the interior of the bead. Before the segments of the disk 64 are moved inwardly the pressure acting upon the plunger 100 is reversed to retract the disk 65. Immediately after the disks 64 and 65 are retracted the group of teeth 228 on the gear 194 and the teeth 222, 223 and 224 on the gear 188 simultaneously complete the second revolutions of the gears 195 and 189, to shift the disk assembly to a position clear of the drum, so that the drum may be collapsed and the completed tire removed therefrom.

In Fig. 36 of the drawings, a development of the operating gears of the movable head C is shown. Since the operations performed by the two heads are identical and performed simultaneously, the arrangement of teeth shown in Fig. 36 corresponds to that shown in Fig. 35, except that certain of the groups of gear teeth are omitted and the direction of rotation is opposite that of the gears on the stationary head. The groups of teeth in Fig. 36 are indicated by the same reference numerals as in Fig. 35, except that the letter *a* is added. It will be noted that the gear 188*a* has no teeth corresponding to the groups 217, 218, 223 and 224 of the gear 188, and that the gear 194*a* has no groups of teeth corresponding to the groups 225 and 226 on the gear 194. The movements of the disks 63 and collar 73 caused by the above mentioned gear teeth on the gears 188 and 194 are unnecessary on the movable head, because of the fact that the disk assembly moves with the carriage C to a position clear of the drum A when the movable head C is retracted to permit collapse of the drum A and the removal of a tire therefrom, and is returned to a position within the drum when the head C is returned to operative position.

*Control system*

As shown in Fig. 1 of the drawings, treadles 231 and 232 are provided on the base 1 in front of the drum for controlling the rotation of the drum, the motor being operated in one direction while one treadle is depressed and in the reverse direction when the other treadle is depressed. In applying the layers of fabric to the tire drum, the drum is rotated in the direction to carry the fabric over the top of the drum, while in applying the tread stock the drum is rotated in the opposite direction to carry the stock around the bottom of the drum.

The motors 19 and 19*a* which actuate the bead building elements of the bead building heads, are started manually and stopped automatically, the two head actuating motors being controlled by push button switches 233 and 234 mounted on the wall of the gear housing, adjacent the top thereof, as shown in Fig. 2. Since the motors controlled by the switches 233 and 234 operate simultaneously, a pivoted plate 235 is provided which overhangs both push buttons so that both of the motors are started into operation when the plate 235 is pressed against the two push buttons 233 and 234.

The actuating motors of the bead building heads are preferably stopped automatically by means of suitable limit switches associated with the operating shaft 15. As shown in Figs. 5 and 6, disks 236 and 237 are attached to the front and rear of the large gear 200. Stop lugs 238 on the disk 237 are positioned in the path of a limit switch 239 for stopping the motor 19. The stop lugs 238 are positioned upon the disk 237 to stop the motor at the completion of a tire building operation with the small Geneva gears over the portions of the large gears indicated at the right hand end of Fig. 35, and also after the initial movement of parts to operative position and after the completion of the initial bead building operation prior to the application of the cover stock as indicated in Fig. 35. Stop lugs 240 and 241 are mounted on the disk 236 in the path of switches 242 and 243 that control the cylinder 101 and brake 13, the switch 242 causing the application of fluid pressure to the cylinder 101 for expanding the disk 65 during the portion of the cycle of operations shown in Fig. 28, and the switch 243 serving to set the brake 13 so that the tire building drum may be collapsed and expanded after the movable head C has been retracted by operation of the shaft 3.

The diagram in Fig. 37 shows the fluid pressure system for actuating the cylinders 101 and 101*a* that apply pressure to the interiors of the beads, for actuating the cylinders 154 and 142 that apply pressure to the pressure rollers and for actuating the brake 13 that holds the sleeve 4 to cause the drum to be collapsed or expanded. This view also shows the electrical circuits controlling the fluid pressure valves and the operating motors on both the stationary and movable head. Parts on the movable head which correspond to parts on the stationary head are designated by the same reference numerals, with the letter *a* added.

Air under pressure for the fluid pressure devices above referred to, is supplied from a suitable reservoir 244 through a pipe line 245 that communicates with valves 246 and 246*a*, that control the delivery of pressure to the opposite ends of the cylinders 101 and 101*a*. Springs 247 and 247*a* normally hold the valves 246 and 246*a* in position to apply pressure to hold the plungers 100 and 100*a* retracted, the valves being operated to reverse the pressure in the cylinders 101 and 101*a* by means of solenoids 248 and 248*a*. The line 245 also communicates with a valve 249 that controls the admission of pressure to the brake 13. A spring 250 normally holds the valve 249 in closed position and a solenoid 251 is adapted to open the valve in opposition to the spring.

The pressure line 245 is connected to the upper end of the cylinder 154 through a pipe line 252 that has two pressure reducing valves 253 and 254 that may be adjusted to regulate the pressure delivered to the upper end of the cylinder 154 and to regulate the pressure in the portion of the line 252 between the two valves. The operation of the cylinders 142 and 154 is under the control of a regulating valve 255 of the spool type that controls the admission to fluid under pressure to the lower ends of the cylinders. The lower end portion of the valve 255 is connected to the pressure line 245 by a pipe line 256 and the upper end portion of the valve is connected to the pipe line 252 between the two pressure reducing valves 253 and 254 by a pipe line 257. A pipe line 258 is connected with the central portion of the valve and has branches 259 and 260 connected to the valve 255 at points spaced above and below the center thereof, below the connection of the pipe line 257 and above the connection of the pipe line 256 to the valve. Delivery of pressure to the lower ends of the cylinders 142 and 154 from the pipe 258 may be controlled by manually adjustable regulating valves 261 and 262 controlling flow of fluid from the pipe 258 to the cylinders 142 and 154 which may be set to adjust the rate of delivery of fluid to the cylinders and the rate of movement of the plungers. The regulating valve 255 has a movable element 263 that has four spaced plunger portions 264, 265, 266 and 267, which control communication between the longitudinally spaced ports of the valve.

The movable element 263 is provided with a lever 268 for adjusting it axially. In the intermediate position of the lever 268, shown in full lines, the ports to which the pipe lines 256 and 257 lead are closed, and the pipe line 258 leading to the lower ends of the cylinders 154 and 142 is connected to atmosphere through a central exhaust port 269. In the uppermost position of the lever 268 the pipe line 257 is connected to the pipe line 258 through the branch 259. In the lowermost position of the lever 268 the pipe line 256 is connected to the pipe 258 through the branch 260.

The pressure delivered to the upper end of the cylinder 154 is reduced by the valves 253 and 254 and is lower than the pressure delivered to its lower end through the valve 255, the pressure actually applied by the cylinder 154 to the pressure rollers being the difference between the pressure applied to the lower end of the cylinder and the pressure applied to the upper end thereof. When the lever 268 is shifted upwardly from its neutral position, the pressure in the portion of the pipe line 252 between the reducing valves 253 and 254 is delivered to the lower ends of the cylinders 142 and 154. When the lever 268 is moved downwardly from its neutral position, full pressure from the line 245 is delivered to the lower ends of both cylinders 142 and 154. By moving the lever 168 up or down from its neutral position a relatively low or a relatively high pressure may be supplied to the cylinders 142 and 154. For example, the pressure in line 245 may be at one hundred pounds, the valve 253 may reduce the pressure to fifty pounds, and the second reducing valve 254 may reduce the pressure to thirty pounds, which pressure is applied continuously to the top of the plunger in the cylinder 154. When the lever 268 is moved to its uppermost position, fifty pound pressure will be delivered to the ends of both cylinders 142 and 154. When the lever 268 is moved downwardly the full pressure of one hundred pounds will be delivered to the two cylinders. With the fifty pound pressure the effective pressure of the cylinder 154 would be twenty pounds and with the one hundred pound pressure the effective pressure of the cylinder 154 would be seventy pounds. It will be understood that the valves 253 and 254 may be adjusted to vary the pressures delivered to the upper end of the cylinder 154 and to the lower ends of the cylinders 142 and 154, so that the desired variations in the applied pressure may be obtained.

By means of the controlling valve 255 a relatively low pressure may be applied to the pressure rollers while the cover stock is being wound onto the drum and a heavier pressure is applied during rotation of the drum after the ends of the cover stock have been spliced together, a lower pressure being applied to the stitching and tread shoulder forming rollers through the cylinder 154 than to the main pressure rollers through the cylinder 142.

One terminal of each of the treadle switches 231 and 232 is connected by a wire 270 to a power line $x$. The second terminal of the forward switch 231 is connected by a wire 271 to a control solenoid 272 by which the motor 8 may be caused to rotate in one direction. A wire 273 connects the second terminal of the reverse switch 232 to a control solenoid 274 by which the motor 8 may be caused to rotate in a reverse direction. The terminals of the solenoids 272 and 274 opposite those connected to the wires 271 and 273, are connected by a wire 275 and the wire 275 is connected to a power line $y$ by a wire 276.

Energization of the solenoid 272 closes four normally open switches 277, 278, 279 and 280. Wires 281 and 282 connect the armature of the motor 8 to switches 277 and 278 which are connected by wires 276 and 283 to lines $y$ and $x$. Wires 284 and 285 connect the switches 279 and 280 to opposite terminals of a field winding 286.

The switch 279 is connected to line $y$ through the wires 275 and 276 and the switch 280 is connected to line $x$ through the wire 283.

The reverse solenoid 274, when energized closes four normally open switches, 287, 288, 289 and 290. The switch 287 is connected through the wire 281 to the motor armature and through the wires 275 and 276 to the line $y$. The switch 288 is connected through the wire 282 to the motor armature and through a wire 291 and the wire 283 to the line $x$. The switches 289 and 290 are connected to the terminals of the field winding 286 through the wires 284 and 285, the switch 289 being connected to line $y$ through the wires 275 and 276, while switch 290 is connected to line $x$ through the wires 291 and 283. The line connection of the switches 287 and 288 is the reverse of the switches 277 and 278 so that the flow through the armature of the motor 8 caused by the actuation of solenoid 274 is reverse to the flow due to the energization of the solenoid 272, so that the motor 8 is driven in one direction upon actuation of the switch 231 and in the opposite direction upon actuation of switch 232.

A wire 293 connects the wire 291 to the solenoid 251 which is connected by a wire 294 to the switch 243 controlled by the shaft 15, which is connected to the line $y$ by a wire 295. When the actuating shaft 15 is in the position which it occupies when stopped after completion of the tire building operation, the switch 243 is in a closed position, so that the air brake 13 is applied and the drum A may be collapsed or expanded by rotation of the motor 8 in a forward or a reverse direction. A wire 296 is connected to the power line $x$ through the wire 270 and to one terminal of each of the two switches 233 and 234. The opposite terminals of the switches 233 and 234 are connected by wires 297 and 297a to solenoids 298 and 298a. Solenoid 298 operates normally open switches 299 and 300 and solenoid 298a operates similar switches 299a and 300a. The switches 299 and 300 are connected to opposite terminals of the motor 19 and through wires 301 and 302 to the lines $x$ and $y$ the solenoid being also connected to the line $y$ through the wire 302. The switches 299a and 300a are similarly connected to the motor 19a and to the lines $x$ and $y$. Switch 239, which is the limit switch which controls the stopping of the motor 19, is immediately closed when the motor 19 is started. To maintain the circuit through the solenoid 298, the switch 239 when closed establishes a connection from the line $x$ through the wire 301, solenoid 298 and wire 302 to line $y$.

Wires 304 and 304a connect the switches 242 and 242a to solenoids 248 and 248a that control the valves 246 and 246a through which pressure is admitted to the cylinders 101 and 101a. Upon closure of the switches 242 and 242a the current delivered to the solenoids 248 and 248a passes from the line $x$ through the wire 270, solenoids 248, 248a, wires 304 and 304a, switches 242 and 242a and wires 295 and 295a to the line $y$.

A motor 305 is provided for shifting the movable head C and this motor drives a shaft 306 having a crank 307 that is connected to the carriage through a rod 308, so that the carriage is moved outwardly and inwardly by a complete revolution of the shaft 306. The operation of the motor 305 is controlled by a switch 309 which is opened and closed by the shaft 15a of the movable head. The switch 309 is connected to the power line $x$ through a wire 310, a switch 311 and a wire 312 and to a motor control solenoid 314 through a wire 313. The opposite terminal of the solenoid 314 is connected to the power line y through a wire 315. The solenoid 314 when energized closes two normally open switches 316 and 317 connected by wires 318 and 319 to terminals of the motor 305 and by wires 320 and 315 to power lines x and y. The carriage C carries a stop 322 that is engageable with the switch 311 at the outward limit of movement of the carriage, to open the switch 311 and stop the motor 305.

A second control switch 323 operated by the shaft 15a is connected through a wire 324, a limit switch 325 and wire 326 to the line x and through a wire 327 to solenoid 314 which is connected to the lien y through the wire 315. The switch 323 controls the return movement of the carriage and the carriage is provided with a second stop 328 that engages with the limit switch 325 to break the motor circuit upon completion of the return movement of the carriage. The lugs operating the switches 309 and 323 are so positioned on the shaft 15a that the switch 309 is closed, and the carriage C is automatically retracted on the completion of the rotation of the shaft 15a and the switch 323 is closed to return the carriage to operative position immediately the motor 19a is started to begin the new cycle of operations.

Operation of the machine

During the periods in which the machine is idle it will be stopped with the movable head C in retracted position and the drum A collapsed. Before starting the machine into operation, the operator will place the bead rings E on the temporary seats formed by the fingers 175. After so placing the bead rings, the drum will be expanded by stepping momentarily on the treadle 231 to rotate the drum forwardly. After the drum has been expanded the plate 235 is pressed inwardly to simultaneously start the motors 19 and 19a. The initial turning movement of the shaft 15 operates the small Geneva gears 189 and 195 through the teeth 217 and 218 on the large gear 188 and the teeth 225 on the large gear 194 to shift the disk 63 and the expansible disks carried thereby into the adjacent end opening of the drum. At the same time the initial rotation of the shaft 15a starts the motor 305 which is driven until it has imparted a one-half turn to the shaft 306 and then stopped by engagement of the stop member 322 with the limit switch 311. This movement of the shaft 306 moves the head C into operative position with respect to the drum and the assembly of expanding disks of the head C is so positioned on the shaft 7 that it is moved into the drum opening as the shaft 7 is moved into engagement with the shaft 3. Continued movement of the shafts 15 and 15a causes the teeth 215 and 215a on the large Geneva gears to operate the sleeves 53 on the two heads to expand the rings 40 to their outermost positions and to transfer the bead rings E from the fingers 175 to the seats 35. Immediately after the ring 40 has been expanded, one of the lugs 238 on the disk 237 is brought into engagement with the limit switch 239 and the corresponding lug carried by the shaft 15a engages the switch 239a so that the motors 19 and 19a are both stopped.

Immediately after the motors 19 and 19a have been stopped, the operator applies the two inner plies of tire fabric to the drum A to form the band D rotating the drum forwardly to wind each ply onto the drum by holding down the treadle 231.

As soon as the plies forming the fabric band D have been applied the operator presses on the plate 235 to close the switches 233 and 234 and again start the motors 19 and 19a which operate the Geneva gears to perform the sequence of operations shown in Figs. 11 to 18 to apply the beads to the fabric band and to fold the fabric around the beads. When the initial bead building operations have been completed and the fabric engaging members have been retracted to the position shown in Fig. 18, the motors 19 and 19a are again stopped by the opening of the limit switch 239 by the second lug 238 carried by the shaft 15 and the opening of the limit switch 239a by a corresponding lug carried by the shaft 15a.

The outer plies of fabric together with the breaker and chaffer strips are then applied in the same manner as the inner plies as the drum is turned in a forward direction under the control of the pedal 231. After the fabric has been applied the rubber cover or tread stock is applied by turning the drum rearwardly under the control of the pedal 232 and applying low pressure to the rollers 121 and 122 by shifting the control lever 268 to low pressure position. The drum is stopped by releasing the treadle 232 just before the end of the stock reaches the rollers 121 and 123 and the drum is backed up a short distance by momentarily depressing the pedal 231. The adjoining ends of the rubber stock are joined together manually and the lever 268 is shifted to high pressure position to cause the pressure rollers 121 and 122 to be pressed with high pressure against the rubber stock and to cause the stitching rollers 123, 124 and 125 and the shoulder pressing rollers 126 to be pressed with somewhat less pressure against the fabric and rubber during three or more revolutions of the drum to firmly stitch the rubber and fabric plies together and to fold the fabric plies inwardly against the exterior of the bead.

The flow regulating valve 262 is so adjusted that the movement of the plunger 153 is so slow when low pressure is applied that the rollers 123, 124, 125 and 126 are not brought into engagement with the stock on the drum during the application of the rubber cover stock G to the fabric. However, when the lever 268 is shifted to the high pressure position the rollers 123, 124, 125 and 126 are quickly brought to engaging position.

After the application of the cover stock, the drum is stopped by release of the treadle 232 and the motors 19 and 19a are again started by pressing the plate 235 against the switches 233 and 234 to complete the rotation of the shafts 15 and 15a.

On the stationary head, engagement of the teeth 221 of the gear 188 with the small Geneva gear 189 causes the disk 63 to be moved inwardly toward the collar 73 so that the disk 64 carried by the disk 63 is expanded and moved into pressing engagement with the outer face of the bead while the edges of the outer fabric plies are folded inwardly by the disks 65, pressure being maintained on the outer face of the bead during the final portion of the movement of the actuating rods 76 by the springs 80 which yield when inward movement of the disk is impeded. While the disk 64 is expanded, the lug 241 momentarily closes the switch 242 to energize the solenoid 248 and operate the valve 246 to reverse the pressure on the plunger 100 and expand the disk 65 to press against the interior of the bead, after which the switch 242 is opened and the valve 246 is moved to pressure reversing position to retract the disk 65, after which the teeth 227 of the gear 194 shifts the collar 73 to collapse the disk 64.

The operation of the movable bead building head C is exactly the same as the stationary head up to the point where the disks are collapsed after the final bead forming operation. After the disks 64 and 65 have been collapsed, the teeth 222, 223, and 224 of the gear 188 and the teeth 228 of the gear 194 on the shaft 15 of the stationary head B move the disk 63 and collar 73 outwardly to position the disk assembly of the stationary head clear of the drum. When stopped at the end of its revolution the lug 241 engages the switch 243 to energize the solenoid 251 and apply pressure to the brake 13.

While the disk assembly of the stationary head B is being shifted out of the drum, the motor 305 on the shiftable head C is started by the closing of the switch 323 by the shaft 15a and is operated until stopped by the opening of the switch 325 by the carriage when it reaches its retracted position. After the motors 19 and 19a have been stopped at the end of the complete cycle with the movable head C in retracted position, the operator collapses the drum by stepping on the treadle 232 to cause the shaft 3 to turn in the reverse direction and collapse the drum, after which the completed tire is removed and the machine is properly positioned for the starting of another tire building operation.

In the machine of the present invention the mechanisms operating upon opposite ends of the drum perform only the operations incidental to the wrapping of the fabric about the bead ring and the application of compacting pressure to complete the bead building operation, so that these mechanisms perform their operations in much less time than where the mechanisms include devices for compacting the body of the tire. The compacting of the body of the tire to firmly unite the fabric plies and the rubber cover stock and the stitching of the outer plies of fabric on the outer face of the tire beads is performed in the machine of the present invention as part of the cover stock applying operation by means of rollers pressing against the stock on the drum while it is being rotated. The bead building operations are performed in predetermined time intervals dependent upon the speed of the motors 19 and 19a, and, since the axially movable actuators have only a short stroke, these time intervals are very short. An experienced operator can apply the fabric plies to the drum in the usual way with great rapidity and the cover stock applying, tire compacting and stitching rollers of the present invention enable these operations also to be performed in a short period of time.

The Geneva gearing employed for actuating the bead forming devices insure correct sequence and accurate timing with a minimum of lost motion between the driving shaft and the axially movable actuators of the bead building heads so that the movements applied to the fabric folding and pressure applying elements can be very rapid with very short time intervals between successive operations.

It is to be understood that the machine herein shown in detail may be varied greatly without departing from the invention herein described and claimed.

What I claim is:

1. The combination with a tire building drum having an opening at an end thereof and a bead positioning shoulder around the opening, an axially movable member coaxial with the drum, a plurality of expansible disks carried by said member, said disks when contracted being of a size to pass through the disk opening, an actuator for said axially movable member, means for moving said actuator to move the disks outwardly and inwardly through said opening, means for stopping said axially movable member intermediate its innermost and outermost positions and for expanding one of said disks to fold fabric outwardly against the outer face of a bead ring positioned on said shoulder, and means for expanding another of said disks to exert a radial outward pressure against the interior of the bead ring.

2. The combination with a tire building drum having an opening at an end thereof and a bead positioning shoulder around the opening, an axially movable member coaxial with the drum, a plurality of expansible disks carried by said member, said disks when contracted being of a size to pass through the disk opening, an actuator for said axially movable member, means for moving said actuator to move the disks outwardly and inwardly through said opening, an actuating member coaxial with said supporting member and movable axially with respect thereto, means interposed between said actuating member and one of said disks for expanding and contracting the same, a second actuating member coaxial with said supporting member and mounted to turn relatively to said supporting member, and means interposed between said second actuating member and another of said disks for expanding and contracting the same.

3. The combination with a tire building drum having an opening at an end thereof and a bead positioning shoulder around the opening, of a fabric folder comprising a plurality of expansible disks mounted side by side coaxially with the drum and of a diameter when unexpanded slightly less than that of the drum opening, means for moving said disks axially into and out of said drum opening, and means for independently expanding said disks.

4. The combination with a tire building drum having an opening at an end thereof and a bead positioning shoulder around the opening, of a fabric folder comprising a supporting member coaxial with said drum and mounted for axial movement, inner and outer expansible disks mounted side by side on said member, each of said disks being composed of radially movable segments, said disks when unexpanded being of a diameter slightly less than that of the drum opening, means for actuating said member axially to move said disks into and out of the drum through the drum opening, means for simultaneously moving the segments of the outer disk radially outward to expand said outer disk to a diameter greater than the drum opening, and independently operable means for actuating the segments of the inner disk to expand said inner disk.

5. The combination with a tire building drum having an opening at an end thereof and a bead positioning shoulder around the opening, of a fabric folder comprising a supporting member, a plurality of expansible disks mounted side by side coaxially with the drum, each of said disks comprising radially movable segments, an actuating member coaxial with said supporting member and relatively movable with respect to said supporting member in an axial direction, a radially swinging link connecting each of the segments of one of said disks to said actuating member, and independently operable means for actuating the segments of the other expansible disk.

6. The combination with a tire building drum having an end opening and a bead seating shoulder portion surrounding the opening, of a shaft coaxial with said drum, a plurality of expansible disks slidable on said shaft, a power driven shaft, means operated by said power driven shaft for moving said disks axially into and out of said drum opening, mechanism operated by said power driven shaft for expanding one of said disks, and an independently operated mechanism controlled by said power driven shaft for expanding another of said disks.

7. The combination with a tire building drum having an end opening and a bead seating shoulder portion surrounding the opening, of a shaft coaxial with said drum, a plurality of expansible disks slidable on said shaft, a power driven shaft, means operated by said power driven shaft for moving said disks axially into and out of said drum opening, mechanism operated by said power driven shaft for expanding one of said disks, and a fluid pressure operated mechanism for expanding another of said disks.

8. The combination with a tire building drum having an end opening and a bead seating shoulder portion surrounding the opening, of a shaft coaxial with said drum, a plurality of expansible disks slidable on said shaft, and means operating sequentially and in predetermined timed relation for moving said disks into and out of said drum opening, for expanding one of said disks to fold fabric radially outwardly against the outer face of a tire bead, and for expanding another of said disks against the interior of the tire bead.

9. The combination with a tire building drum having an end opening and a bead seating shoulder portion surrounding the opening, of a shaft coaxial with said drum, a plurality of expansible disks slidable on said shaft, each of said disks comprising radially movable segments, a collar slidable upon said shaft, radially swinging links connecting said collar to the segments of one of the disks, a ring concentric with another of said disks and mounted to turn relative to the same, links connected by axial pivots to the segments of the last mentioned disks and said ring, and means for actuating said collar and ring to expand and contract said disks.

10. In combination with a tire building drum having an opening at its end and a bead positioning shoulder around the opening, a shaft coaxial with the drum, a supporting member slidably mounted on said shaft, three expansible disks mounted side by side on said supporting member, each of said disks comprising radially movable segments, power actuated means for reciprocating said supporting member on the shaft into and out of said drum opening, power actuated means for expanding and contracting the inner and outer disks, springs acting upon the segments of the intermediate disks to press them outwardly, and means interposed between said intermediate disks and one of the other disks for limiting the outward movements of the segments of said intermediate disk.

11. In combination with a tire building drum having an opening at its end and a bead positioning shoulder around the opening, a shaft coaxial with the drum, a supporting member slidably mounted on said shaft, three expansible disks mounted side by side on said supporting member, each of said disks comprising radially movable segments, power actuated means for reciprocating said supporting member on the shaft into and out of said drum opening, a collar slidable upon said shaft, links connecting said collar to the segments of one of said expansible disks, a ring mounted to turn about the axis of the shaft, links connecting said ring to segments of another of the expansible disks, springs pressing the segments of the third disk outwardly, means for limiting the outward movements of the spring pressed segments with respect to the segments of one of the other disks, and means for imparting axial movements to said supporting member and collar and turning movements to said ring in a predetermined sequence and in a predetermined timed relation.

12. A tire building machine comprising a tire building drum having an end opening and a bead seating shoulder portion surrounding the opening, an expansible fabric folding member movable axially into and out of an end opening of the drum to an inner position within the drum or to an outer position laterally clear of the drum, said member having a fabric engaging periphery normally of slightly less diameter than said opening, means operable while said folding member is in its inner position to fold an inner fabric ply radially inwardly over the drum shoulder and to apply a bead ring to the fabric overlying the shoulder, means for moving said folding member axially outwardly to fold the inner ply against the interior of the bead ring, means operable while said folding member is in its outer position to fold an outer ply of fabric radially inwardly over the outside of the bead ring, means for moving said folding member inwardly to fold said outer ply against the interior of the bead ring, and means for expanding said folding member to apply radial pressure to the interior of the bead.

13. A tire building machine comprising a tire building drum having an end opening and a bead positioning shoulder around the opening, a member coaxial with the drum and mounted for movement axially toward and away from the drum, a disc carried by said member having an inner side face engageable with a bead on said shoulder throughout the circumference thereof, an expansible disc carried by said member and engageable with the interior of a bead on said shoulder, and means for simultaneously pressing the first mentioned disc against the outer face of the bead and expanding the expansible disc against the interior of the bead.

14. A tire building machine comprising a tire building drum having an end opening and a bead positioning shoulder around the opening, means engageable with the outer face of a tire bead in said shoulder substantially throughout its circumference for pressing the bead against said shoulder, and means simultaneously engageable with the interior of the tire bead for applying a radial outward pressure thereto simultaneously throughout the bead circumference.

15. A tire building machine comprising a tire building drum having an end opening and a bead positioning shoulder around the opening a laterally movable pressure applying member engageable with the outer side face of a tire bead on said shoulder substantially throughout the circumference of the bead, an expansible member engageable with the interior of the bead substantially throughout its circumference, and means for simultaneously engaging said laterally movable and expansible members with the bead, pressing said laterally movable member against the side of the bead and expanding the expansible member against the interior of the bead.

16. A tire building machine comprising a tire building drum having a bead positioning shoulder at an end thereof, a fabric folding disc coaxial with the drum and of a diameter but slightly less than the bead opening of the tire, said disc being movable axially toward and away from said end of the drum, power operated means for moving said disc outwardly to a position beyond the end of the drum and inwardly into the bead opening of a tire on the drum, a mechanism for folding outer plies of tire fabric inwardly over the outer face of the tire bead and into the path of said disc while said disc is spaced outwardly from the end of the drum and means to move the disc axially toward the drum to fold the fabric against the interior of the tire bead.

17. In combination with a tire building drum having an opening at an end thereof and a bead positioning shoulder around said opening, a fabric folder comprising an expansible disc of a diameter when unexpanded slightly less than that of the drum opening and mounted coaxially with the drum for movements into and out of said drum opening, actuating mechanism for imparting axial movements to said disc, and fluid pressure operated means controlled by said actuating mechanism for expanding said disc.

WALTER J. BRETH.

REFERENCES CITED

The following references are of record in the file of this patent:

UNITED STATES PATENTS

| Number | Name | Date |
| --- | --- | --- |
| 1,834,559 | Waner | Dec. 1, 1931 |
| 1,834,560 | Warner | Dec. 1, 1931 |
| 1,855,229 | Flener | Apr. 26, 1932 |
| 1,862,024 | Leguillon et al | June 7, 1932 |
| 1,921,579 | Otto | Aug. 8, 1933 |
| 2,239,453 | Bostwick | Apr. 22, 1941 |
| 2,262,259 | Shook | Nov. 11, 1941 |
| 2,313,035 | Breth | Mar. 9, 1943 |
| 2,320,190 | Miller | May 25, 1943 |
| 2,354,434 | Stevens | July 25, 1944 |